US007877354B2

(12) United States Patent
Dane et al.

(10) Patent No.: US 7,877,354 B2
(45) Date of Patent: *Jan. 25, 2011

(54) METHOD AND APPARATUS FOR SENDING AND TRACKING RESUME DATA SENT VIA URL

(75) Inventors: Mark Dane, Sharon, MA (US); Michael Hennessy, Chestnut Hill, MA (US); David W. Crossman, Newton, MA (US)

(73) Assignee: Kenexa Brassring, Inc., Wayne, PA (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/825,654

(22) Filed: Jul. 6, 2007

(65) Prior Publication Data

US 2008/0147736 A1    Jun. 19, 2008

Related U.S. Application Data

(63) Continuation of application No. 10/846,765, filed on May 14, 2004, now Pat. No. 7,251,658, which is a continuation of application No. 09/537,536, filed on Mar. 29, 2000, now Pat. No. 6,785,679.

(51) Int. Cl.
*G06F 7/00* (2006.01)
(52) U.S. Cl. .................. 707/613; 707/636; 707/688; 707/803; 707/805
(58) Field of Classification Search ............. 707/1, 707/3, 10, 101, 710, 707, 609, 613, 636, 707/687, 688, 803, 805; 705/9
See application file for complete search history.

(56) References Cited

U.S. PATENT DOCUMENTS 5,164,899 A    11/1992    Sobotka et al.

(Continued)

FOREIGN PATENT DOCUMENTS

CA    2277261 A    9/1999

(Continued)

OTHER PUBLICATIONS

Authur Keller et al., "Zippering: Managing intermittent connectivity in DIANA", ACM, 1997, pp. 357-364.*

(Continued)

*Primary Examiner*—Thuy N Pardo
(74) *Attorney, Agent, or Firm*—Foley & Lardner LLP

(57) ABSTRACT

A resume database system allows for resume records on the resume database system to be viewed by others via a Uniform Resource Locator, URL. In addition, in response to instructions from an authorized user of the resume database system, input from an unauthorized, but otherwise verified, source can be added to the database by the resume database system. The verified user accesses the resume database and completes any necessary forms via a web browser and submits the information. The authorized user defines the actions that the verified user is allowed to take. These actions include, for example, only being able to review resume information, or being able to add information to the resume database without needing training on the operation of the database. A resume database server system coordinates the activity of the authorized and verified users. Communications between all three users is accomplished via a computer network.

9 Claims, 19 Drawing Sheets

U.S. PATENT DOCUMENTS

| | | | |
|---|---|---|---|
| 5,197,004 A | | 3/1993 | Sobotka et al. |
| 5,258,855 A | | 11/1993 | Lech et al. |
| 5,315,504 A | | 5/1994 | Lemble |
| 5,361,355 A | | 11/1994 | Kondo et al. |
| 5,379,420 A | | 1/1995 | Ullner |
| 5,412,384 A | | 5/1995 | Chang et al. |
| 5,550,967 A | | 8/1996 | Brewer et al. |
| 5,604,900 A | | 2/1997 | Iwamoto et al. |
| 5,608,904 A | | 3/1997 | Chaudhuri et al. |
| 5,664,109 A | | 9/1997 | Johnson et al. |
| 5,675,780 A | | 10/1997 | Plant-Mason et al. |
| 5,694,610 A | | 12/1997 | Habib et al. |
| 5,721,827 A | | 2/1998 | Logan et al. |
| 5,732,216 A | | 3/1998 | Logan et al. |
| 5,740,425 A | | 4/1998 | Povilus |
| 5,748,975 A | | 5/1998 | Van De Vanter |
| 5,758,126 A | | 5/1998 | Daniels et al. |
| 5,758,324 A | | 5/1998 | Hartman et al. |
| 5,806,057 A | | 9/1998 | Gormley et al. |
| 5,809,248 A | | 9/1998 | Vidovic |
| 5,819,301 A | | 10/1998 | Rowe et al. |
| 5,832,496 A | | 11/1998 | Anand et al. |
| 5,832,497 A | * | 11/1998 | Taylor ..................... 707/104.1 |
| 5,855,007 A | | 12/1998 | Jovicic et al. |
| 5,857,183 A | | 1/1999 | Kableshkov |
| 5,860,067 A | | 1/1999 | Onda et al. |
| 5,864,848 A | | 1/1999 | Horvitz et al. |
| 5,873,056 A | | 2/1999 | Liddy et al. |
| 5,884,309 A | | 3/1999 | Vanechanos |
| 5,907,837 A | | 5/1999 | Ferrel et al. |
| 5,937,406 A | | 8/1999 | Balabine et al. |
| 5,973,696 A | | 10/1999 | Agranat et al. |
| 5,987,422 A | * | 11/1999 | Buzsaki ......................... 705/9 |
| 5,999,939 A | | 12/1999 | de Hilster |
| 6,018,749 A | | 1/2000 | Rivette et al. |
| 6,044,382 A | | 3/2000 | Martino |
| 6,047,296 A | | 4/2000 | Wilmott et al. |
| 6,078,924 A | | 6/2000 | Ainsbury et al. |
| 6,185,573 B1 | | 2/2001 | Angelucci |
| 6,199,048 B1 | | 3/2001 | Hudetz et al. |
| 6,202,023 B1 | | 3/2001 | Hancock et al. |
| 6,233,618 B1 | | 5/2001 | Shannon |
| 6,246,996 B1 | | 6/2001 | Stein et al. |
| 6,266,659 B1 | * | 7/2001 | Nadkarni ....................... 707/3 |
| 6,301,574 B1 | | 10/2001 | Thomas et al. |
| 6,311,164 B1 | | 10/2001 | Ogden |
| 6,321,228 B1 | * | 11/2001 | Crandall et al. ............... 707/10 |
| 6,324,538 B1 | | 11/2001 | Wesinger |
| 6,370,510 B1 | | 4/2002 | McGovern et al. |
| 6,381,592 B1 | | 4/2002 | Reuning |
| 6,385,620 B1 | | 5/2002 | Kurzius |
| 6,430,577 B1 | * | 8/2002 | Hart ........................... 707/609 |
| 6,658,400 B2 | * | 12/2003 | Perell et al. ................. 707/687 |
| 6,785,679 B1 | | 8/2004 | Dane et al. |
| 6,993,723 B1 | | 1/2006 | Danielsen et al. |
| 6,996,561 B2 | | 2/2006 | De Hilster et al. |
| 7,251,658 B2 | | 7/2007 | Dane et al. |
| 7,505,919 B2 | * | 3/2009 | Richardson ..................... 705/8 |
| 2001/0047347 A1 | * | 11/2001 | Perell et al. ..................... 707/1 |
| 2002/0002479 A1 | | 1/2002 | Almog et al. |
| 2002/0069080 A1 | | 6/2002 | Roy et al. |
| 2003/0229638 A1 | | 12/2003 | Carpenter |
| 2004/0215623 A1 | | 10/2004 | Dane et al. |

FOREIGN PATENT DOCUMENTS

| | | |
|---|---|---|
| EP | 0 748 095 | 12/1996 |
| WO | WO95/24687 A1 | 9/1995 |
| WO | WO01/97086 A1 | 12/2001 |

OTHER PUBLICATIONS

Advisory Action dated Nov. 26, 2008 for U.S. Appl. No. 10/655,572.
Exhibit A Invalidity Contentions of Taleo in view of US Patent No. 5,864,848 to Horvitz et al, Jan. 31, 1997.
Exhibit B Invalidity contentions of Taleo in view of US Patent No. 5,258,855 to Lech et al, Nov. 2, 1993.
Exhibit C Invalidity Contentions of Taleo in vie of Alleged Admissions Made in Reexamination of US Patent No. 5,999,939—de Hilsters Admissions, Dec. 7, 1999.
Exhibit D Invalidity Contentions of Taleo in view of US Patent No. 5,664,109 to Johnson et al, Sep. 2, 1997.
Exhibit E Invalidity Contentions of Taleo in view of US Patent No. 5,258,855 to Lech et al in combination with US Patent No. 5,758,324 to Hartman et al, Jan. 26, 1999.
Exhibit F Invalidity Contention of Taleo in view of US Patent No. 5,864,848 to Horvitz et al in combination with US Patent 5,758,324 to Hartman et al, Jan. 31, 1997.
Exhibit G—de Hilsters Admissions—to Taleo Corporation's Objections and Responses (5 pgs.), 1998.
Exhibit G Invalidity Contentions of Taleo in view of US Patent No. 5,258,855 to Lech and de Hilsters Admissions, 1998.
Exhibit H Invalidity Contentions of Taleo in view of US Patent No. 5,664,109 to Johnson et al in combination with US Patent No. 5,860,067 to Onda et al, 1999.
Exhibit I Invalidity Contentions of Taleo in view of US Patent No. 5,664,109 to Johnson et al in combination with US Patent No. 5,578,324 to Hartman et al, 1999.
Exhibit J Invalidity Contentions of Taleo in view of US Patent No. 5,664,109 to Johnson et al in combination with US Patent No. 5,258,855 to Lech et al, 1999.
Exhibit J—Microsoft Outlook for Dummies—to Taleo Corporation's Objections and Responses, 1999.
Exhibit K The Recruiter with IRIS, 1999.
Exhibit L Microsoft Outlook 97 for Windows for Dummies alleged to relate to multiple users to access and update a common database over a network copyright 1997.
Greengar, S., HR's Great Enabler—Intranets are Revolutionizing the Way Human Resources Departments Operate, Published Sep. 15, 1997, issue of Industry Week.
Inter Partes Examination Action Closing Prosecution for U.S. Appl. No. 95/001,060 dated Jun. 4, 2009.
Inter Partes Notice of Assignment of Inter Partes Reexamination Request of US Patent No. 6,996,561: U.S. Appl. No. 95/001,060, entered on Jul. 8, 2008.
Inter Partes Reexamination Request on US Patent No. 6,996,561: U.S. Appl. No. 95/001,060, filed Jun. 30, 2008 [Part A].
Inter Partes Reexamination Request on US Patent No. 6,996,561: U.S. Appl. No. 95/001,060, filed Jun. 30, 2008 [Part B].
Inter Partes Reexamination Request on US Patent No. 6,996,561: U.S. Appl. No. 95/001,060, filed Jun. 30, 2008 [Part C].
International Search Report dated Oct. 15, 2002 for PCT/US01/10126.
Interview Summary dated Mar. 18, 2005 for U.S. Appl. No. 09/948,408.
Interview Summary dated Dec. 14, 2009 for U.S. Appl. No. 11/191,898.
Interview Summary dated Dec. 16, 2009 for U.S. Appl. No. 10/655,572.
*Kenexa Brassring Inc. v. Taleo Corporation*, Answer and Counterclaims, Civil Action No. 07CV521 SLR, filed Jan. 28, 2008 in the United States District Court for the District of Delaware.
*Kenexa Brassring Inc. v. Taleo Corporation*, Complaint, Civil Action No. 07CV521SLR, filed Aug. 27, 2007 in the United States District Court for the District of Delaware.
*Kenexa Brassring, Inc. v. Taleo Corporation*, CA No. 07-521 (SLR), Taleo Corporation's Objections and Responses to Kenexa Brassring, Inc.'s Contention Interrogatories, filed Jun. 27, 2008.

*Kenexa Brassring, Inc.* v. *Taleo Corporation*, CA No. 07-521-SLR, Taleo Corporations First Supplemental Objections and Responses to Kenexa Brassring Inc's Contention Interrogatories, filed Sep. 9, 2008.
*Kenexa Brassring, Inc.* v. *Vurv Technology, Inc.*, CA No. 08-276, Answer, filed May 29, 2008.
*Kenexa Brassring, Inc.* v. *Vurv Technology, Inc.*, Complaint, filed May 9, 2008.
Kennedy et al, Electronic Job Search Revolution Second Edition: Win With the New Technology That's Reshaping Today's Job Market, Published by John Wiley and Sons, Inc., Copyright 1995.
Kennedy et al, Electronic Job Search Revolution: Win With the New Technology That's Reshaping Today's Job Market, Published by John Wiley and Sons, Inc., Copyright 1994.
Kennedy et al, Electronic Resume Revolution Second Edition: Creating a Winning Resume for the New World of Job Seeking, Published by John Wiley and Sons, Inc., Copyright 1995.
Kennedy et al, Electronics Resume Revolution—Create a Winning Resume for the New World of Job Seeking, Copyright 1994.
Kennedy, Joyce Lain, Hook up, Get Hired!: The Internet Job Search Revolution, Published by John Wiley and Sons, Inc., Copyright 1995.
Kennedy, Joyce Lain, The Job Search Goes computer, 55(1):42-46; Fall 1994.
Microsoft Outlook 97—Administrator's Guide (19 pgs), 1997.
Order Granting Reexam dated Sep. 5, 2008, in Inter Partes Reexamination of US Patent No. 6,996,561; Reexamination Control No. 95/001,060.
Redmond, Tony, Microsoft Exchange server V5.0; Planning Design and Implementation, copyright 1997.
Sheley, E., High Tech Recruiting Methods, copyright 2008 The Gale Group, copyright 2005 Society for Human Resource Management.
Starcke, Alice M., Internet Recruiting Shows Rapid Growth, Aug. 1, 1996.
Taleo's Second Production of Alleged Prior Art References Supporting Exhibit K produced Sep. 9, 2008.
Unlabeled Exhibit to Taleo Corporation's Objections and Responses, Re: 561 Horvitz chart, 1999.
Unlabeled Exhibit to Taleo Corporation's Objections and Responses, Re: 561 Johnson chart, 1999.
Unlabeled Exhibit to Taleo Corporation's Objections and Responses, Re: 561 Lech chart, 1999.
Unlabeled Exhibit to Taleo Corporation's Objections and Responses, Re: admissions combination charts, 1999.
Unlabeled Exhibit to Taleo Corporation's Objections and Responses, Re: '561 Patent Claim Chart based on Horvitz and Hartman.
Unlabeled Exhibit to Taleo Corporation's Objections and Responses, Re: '561 Patent Claim Chart based on Horvitz and Johnson, 1999.
Unlabeled Exhibit to Taleo Corporation's Objections and Responses, Re: '561 Patent Claim Chart based on Johnson and Hartman, 1999.
Unlabeled Exhibit to Taleo Corporation's Objections and Responses, Re: '561 Patent Claim Chart based on Johnson and Lech, 1999.
Unlabeled Exhibit to Taleo Corporation's Objections and Responses, Re: '561 Patent Claim Chart based on Lech and Hartman, 1999.
Unlabeled Exhibit to Taleo Corporation's Objections and Responses, Re: '939 Patent Claim Chart based on Admissions Plus Horvitz, 1999.
Unlabeled Exhibit to Taleo Corporation's Objections and Responses, Re: '939 Patent Claim Chart based on Admissions Plus Lech, 1999.
Unlabeled Exhibit to Taleo Corporation's Objections and Responses, Re: '939 Patent Claim Chart Based on Horvitz, 1999.
Unlabeled Exhibit to Taleo Corporation's Objections and Responses, Re: '939 Patent Claim Chart based on Horvitz and Hartman, 1999.
Unlabeled Exhibit to Taleo Corporation's Objections and Responses, Re: '939 Patent Claim Chart based on Horvitz and Johnson, 1999.
Unlabeled Exhibit to Taleo Corporations Objections and Responses, Re: '939 Patent Claim Chart based on Johnson, 1999.
Unlabeled Exhibit to Taleo Corporation's Objections and Responses, Re: '939 Patent Claim Chart based on Johnson and Hartman, 1999.
Unlabeled Exhibit to Taleo Corporation's Objections and Responses, Re: '939 Patent Claim Chart based on Johnson and Lech, 1999.
Unlabeled Exhibit to Taleo Corporation's Objections and Responses, Re: '939 Patent Claim Chart Based on Lech, 1999.
Unlabeled Exhibit to Taleo Corporation's Objections and Responses, Re: '939 Patent Claim Chart based on Lech and Hartman, 1999.
US Notice of Allowance dated Apr. 13, 2005 for U.S. Appl. No. 09/948,408.
US Office Action dated Feb. 19, 2010 for U.S. Appl. No. 10/655,572.
US Office Action dated Feb. 21, 2008 for U.S. Appl. No. 11/191,898.
US Office Action dated Mar. 11, 2009 for U.S. Appl. No. 10/655,572.
US Office Action dated Jun. 16, 2008 for U.S. Appl. No. 10/655,572.
US Office Action dated Oct. 5, 2009 for U.S. Appl. No. 11/191,898.
US Office Action dated Oct. 26, 2009 for U.S. Appl. No. 10/655,572.
US Office Action dated Nov. 3, 2008 for U.S. Appl. No. 11/191,898.
US Office Action dated Nov. 6, 2007 for U.S. Appl. No. 10/655,572.
US Office Action dated Nov. 23, 2004 for U.S. Appl. No. 09/948,408.
US Office Action dated Mar. 26, 2010 for U.S. Appl. No. 11/191,898.
Wald et al, Patient Entries in the Electronic Medical Record: an Interactive Interview used in Primary Care, AMIA, Inc., pp. 147-151, 1995.
Barchilon, Technology's Impact on Online Resumes, IEEE, 1998, pp. 183-187.
*Brassring Inc.* v. *Interactive Search Inc.*, Complaint, Civil Action No. 00CV11525JLT, filed Jul. 31, 2000 in the United States District Court for the District of Massachusetts.
Chabrow, E.R., "Online employment (World Wide Web: job hunting and recruitment applications)," Information Week, Jan. 23, 1995, No. 511, pp. 38-41, 44-45.
Goth et al., "Scarcity of IT Workers is the Mother of Recruiter Innovations", IEEE, 1999, pp. 15-17.
Maltais, "Conducting a Job Search on the Internet", IEEE, 1997, pp. 131-133.
Romei, L.K., "Human resource management keeps computers humming (job applications processing)," Managing Office Technology, Nov. 1994, vol. 39, No. 11, pp. 45.
Noah, William W. and Rollin V. Weeks, "TRW: Description Of The Deft System As Used For MUC-5," pp. 237-248, Aug. 1993.
Browne, S. Dongarra, J. Green, S., Moore, K., Pepin, T., Rowan, T., Wade, R. "Location-Independent Naming for Virtual Distributed Software Repositories," University of Tennessee, Eric Grosse, AT&T Laboratories, p. 179-185, Aug. 1995.

* cited by examiner

Search Results

Total Candidates: 6,146 Candidates Displayed: 1-20 Candidates Selected: 2

| Select | Job Title | City | Last Name | Organization | School | State | Home Phone | Degree |
|---|---|---|---|---|---|---|---|---|
| 1 | | | Bond | | | | | |
| 2 | | | Gail | | | | | |
| 3 | | | Rendano | | | | | |
| 4 | Customer Support Engineer | Watertown | Jones | Intel | Rutgers University | MA | (123)-456-7890 | Certificate |
| 5 | Consultant | New York | Kinney | Motorola | Boston College | NY | (123)-456-7890 | BACHELORS |
| 6 | Project Manager | Seaside | Dolan | AT+T | UNIV OF CALIFORNIA | CA | (123)-456-7890 | BACHELORS |
| 7 | Assistant Marketing | Larkspur | Yellin | U.S. Army | LONG ISLAND UNIVERSITY | CA | (123)-456-7890 | BACHELORS |
| 8 | Executive Assistant | South San Francisco | Beron | Trader Joe's | SAN FRANCISCO STATE UNIVERSITY | CA | (123)-456-7890 | BACHELORS |
| 9 | | | Redford | | | | | |
| 10 | Customer Support Engineer | Watertown | Smith | Ground Round | Northeastern University | MA | (123)-456-7890 | none |
| 11 | Manager | Newton | Hayes | Ben & Jerry's | University Of Texas At Austin | MA | (123)-456-7890 | MASTERS |
| 12 | Consultant | San Francisco | Schubert | jin software | UNIVERSITY OF SAN FRANCISCO | CA | (123)-456-7890 | MASTERS |

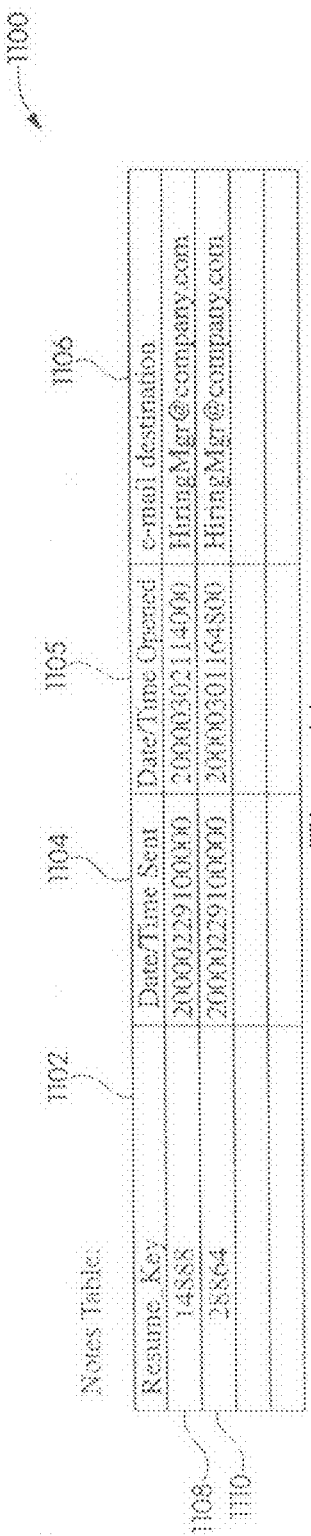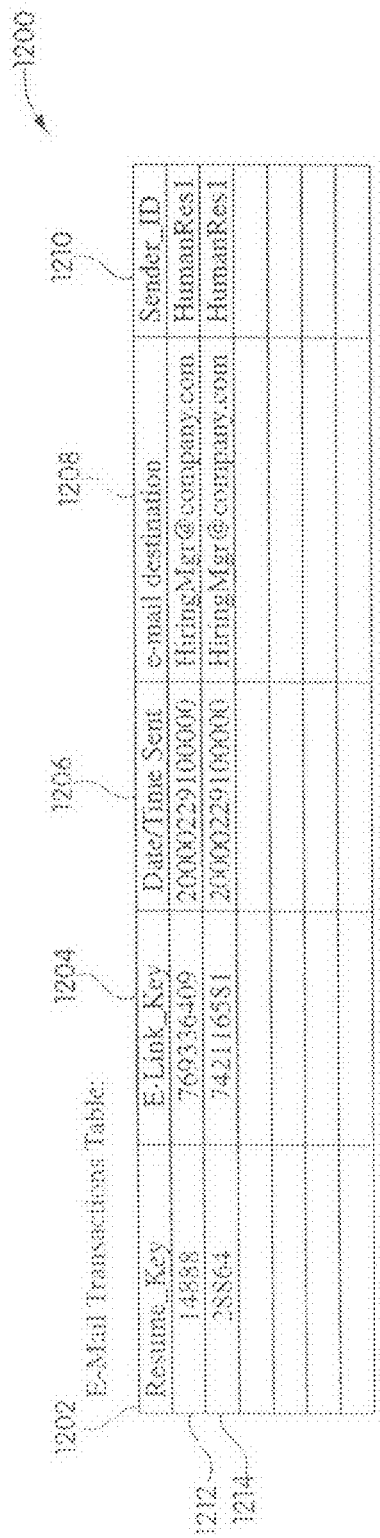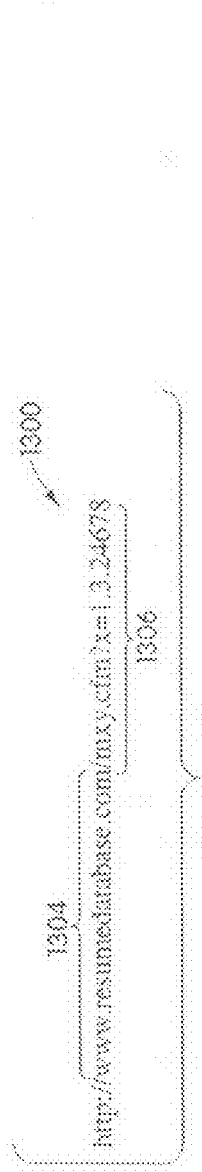

Previous Assignments/Assessments:
Startup Compatibility (Rank 1-10)
Able to do the Job (Rank 1-10)
Willing to do the Job (Rank 1-10)
*Manageability (Rank 1-10)

Self Submitted Questions:
Describe your work experience.

HR experience ○ Yes ○ No
HRIS Experience ☐ No ☐ PeopleSoft ☐ Oracle ☐ Research
☐ SAP ☐ Baan ☐ Other
*RMS Experience ☐ No ☐ Rezlrad ☐ Alexis
☐ Resumix ☐ SkillSet
☐ Personic ☐ Green Tree ☐ Other
*Work history gaps? ○ Yes ○ No
If yes please explain.

Describe how your are contributing to the overall goals of your department and company.

METHOD AND APPARATUS FOR SENDING AND TRACKING RESUME DATA SENT VIA URL

CROSS REFERENCE TO RELATED APPLICATION

This application claims the benefit under 35 U.S.C. §120 as a continuation of U.S. Non-provisional application Ser. No. 10/846,765, filed May 14, 2004, entitled "METHOD AND APPARATUS FOR SENDING AND TRACKING RESUME DATA SENT VIA URL," of which application claims the benefit under 35 U.S.C. §120 as a continuation of U.S. Non-provisional application Ser. No. 09/537,536, filed Mar. 29, 2000, entitled "METHOD AND APPARATUS FOR SENDING AND TRACKING RESUME DATA SENT VIA URL."

BACKGROUND

Recently, with the increased use of the Internet, large databases containing resumes from individuals seeking new employment opportunities have been created. In one system, the database includes a scanned image of a person's printed resume with some searchable terms attached to the image as an index. In another system the scanned image is stored and Optical Character Recognition (OCR) is performed on it to obtain and store searchable terms in the index. Yet another system has the individual copy text data from a resume, displayed in the word processing program in which it was prepared, e.g., Corel's WordPerfect or Microsoft Word, into different display fields to place the resume data into the resume database. Irrespective of how the resume information is placed in the database, however, it is necessary to be able to search for and find candidates that are qualified for a particular job opening.

Typically, one or more members of a corporation's Human Resources organization are trained in using the resume database, i.e., how to search the resume database to identify candidates who might be qualified to fill open positions. When a candidate is identified, however, the information needs to be shared with a Hiring Manager, i.e., the individual that is looking to fill an opening in the organization. Often, a corporation has specific procedures to be followed in the review/interview process. Some of these procedures are related to complying with EEOC regulations as well as related to internal record-keeping requirements. Compliance with procedure is monitored by the Human Resources department.

Usually the Hiring Manager is not trained in using the resume database because it is neither cost-effective nor efficient for this training to be provided to all potential Hiring Managers in a corporation. Thus, information from the Hiring Manager regarding a candidate that has been found in a search of the resume database generally is entered by the Human Resources organization. Entering all of this information is a heavy burden for the Human Resources organization, especially in a large corporation. Further, the potential for incorrect information to be entered into the resume database with respect to a candidate increases as more people are involved in placing the information into the database. Finally, keeping track of resumes that have been forwarded to a Hiring Manager and monitoring the Hiring Manager's actions is a difficult process.

Training all potential Hiring Managers how to use the resume database to insert information regarding a candidate is inefficient. A Hiring Manager's use of the resume system might be so infrequent that the training is forgotten due to non-use. In addition, because Hiring Managers would use the database infrequently, the cost of a license for each Hiring Manager may not justify its benefits.

SUMMARY OF THE INVENTION

To address the inadequacies of these known systems, a resume database system is provided so that a person who is unfamiliar with the resume database can receive resume information about a qualified candidate and is able to enter information about the candidate directly into the resume database. Whether or not the recipient, e.g., a Hiring Manager, will be allowed to add information to the resume database depends on the person, e.g., a Human Resources Recruiter, who sent the resume information to the Hiring Manager.

The resume database system also may track the activity of the Hiring Manager, relative to the received resume information, by recording this activity in the resume database. As an example, the date and time that the Hiring Manager accesses the resume information is recorded as are any comments that the Hiring Manager may enter or actions the Hiring Manager may take as to that particular candidate. Further, another user of the system can be notified of the Hiring Manager's comments and/or actions. This tracking and recording of the activities of the Hiring Manager allows the Recruiter to identify situations where information is being forwarded but not being acted upon in a timely manner.

The Hiring Manager may be authorized only to review the resume information without adding any comments to the database. Alternatively, the Hiring Manager may be authorized to add limited amounts or types of comments to the resume database with respect to the candidate. Still further, the Hiring Manager may be authorized to review what others (within the corporation) have said about the candidate. This determination is made by the Human Resources Recruiter when the candidate is identified as possibly being qualified for a present job opening.

BRIEF DESCRIPTION OF THE DRAWINGS

FIG. 8 is an example web page for a client system, such as in FIG. 1;

FIG. 9 is an example web page for a client system, such as in FIG. 1;

FIGS. 11 and 12 show tables in a resume database according to an example of the resume system;

FIG. 13 shows the format of a Uniform Resource Locator (URL) pointing to resume data according to one embodiment of the example resume system;

FIG. 17 shows a form for adding data to a resume database according to the example resume system;

FIGS. 18 and 19 show alternate web page formats for viewing resume data according to another aspect of the example resume system;

DETAILED DESCRIPTION

Figure 1:
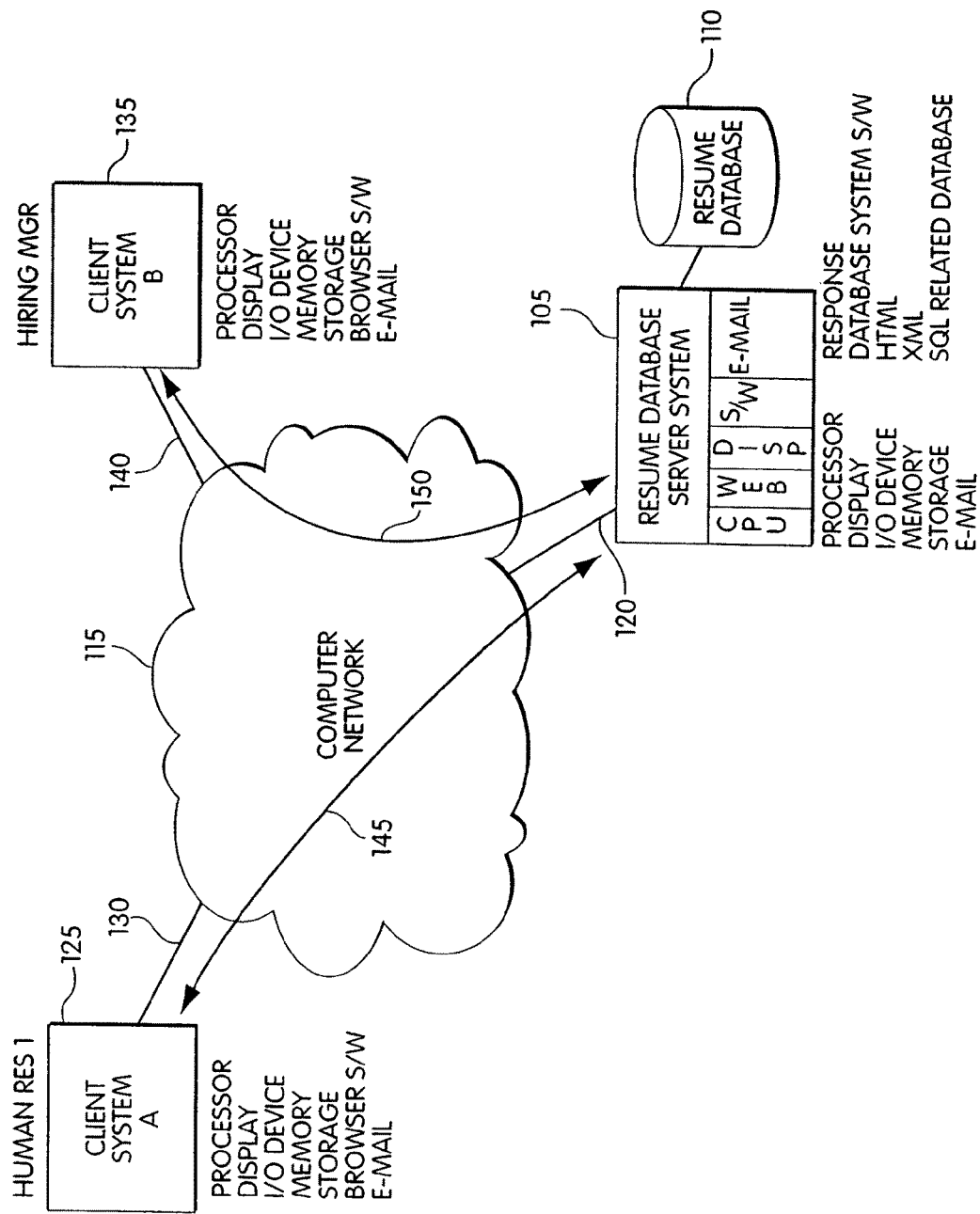
FIG. 1 is a top level representation of an example resume system.

In FIG. 1, a resume database server system 105 is coupled to a resume database 110. The server system 105 includes a computer with a display, an input/output device (keyboard, mouse, etc.), memory and a storage device. The resume database server system 105 includes software that is stored on the storage device and executed by the computer to access the information in the resume database 110. In addition, the resume database server system 105 includes a messaging software program to both send and receive messages. The resume database server system 105 and its software operate to allow resume data to be stored in the resume database 110 and for the resume information stored in the resume database 110 to be searched by multiple users at the same time.

The resume database server system 105 can be any one of a number of commercially available computers. These include, but are not limited to, computers using an Intel™ computer chip or a Sun computer or a Power PC personal computer. The operating system software can also be any one of a number of commercially available systems including, but not limited to, Unix, Windows NT, Windows 95, Windows 98, Windows 2000, Linux, and Solaris. The computer code for the operating system is stored on the storage device, i.e., a hard disk drive, of the resume database server system 105 and transferred to memory when being run by the computer.

The resume database server system 105 communicates with a computer network 115, e.g., the public Internet, via a communications channel 120. The resume database server system 105 includes hardware to facilitate communication over the link 120.

Communication software also is also provided to send and receive communications over the link 120.

A first client system 125 connects to the computer network 115 via a communications channel 130. The first client system 125 can include a computer, a display, memory, a storage device, a keyboard and a mouse. In addition, hardware and software used to facilitate the communication via the communications channel 130 with the network 115 can be included. This hardware could be, for example, a modem for communicating over a phone line or an Ethernet adapter card to access a Local Area Network that has a connection to the network 115. The first client system 125 also includes software that is executed by the computer to facilitate communication over the network 115. Examples of such software include, but are not limited to, Internet Explorer available from Microsoft Corporation or Netscape Navigator available from America Online.

A second client system 135 also communicates via a communications channel 140 with the network 115. The second client system 135 can have a configuration that is similar to the first client system 125.

Each of the first and second client systems 125, 135 includes software to allow the respective system to send and receive e-mail messages and attachments.

The following description is provided as an example for explanatory purposes only and is not intended to be limiting. Information from resumes that have been received by a company or corporation are stored by the resume database server system 105 in the resume database 110. A member of the Human Resources Department, e.g., a Recruiter, using the first client system 125, accesses the resume database server system 105 via the communications channel 130, the network 115 and the communications channel 120 represented generally by the bi-directional path 145. The resume database software on the resume database server system 105 allows the Recruiter to search the resume information in the resume database 110 to identify candidates for current job openings.

As will be described in more detail below, the Recruiter directs the resume database server system 105 to send a communication via communications channel 120, the network 115 and communications channel 140 to the second client system 135 as generally identified by the bi-directional arrow 150. As an illustrative example, the individual operating the second client system 135 is a Hiring Manager in a department of the company that has an opening that needs to be filled. The Recruiter, operating the first client system 125, attempts to locate a candidate for this position by accessing the resume database 110.

The Recruiter accesses the resume database 110 to search for and identify candidates that appear qualified to fill currently open job positions. The Recruiter then can arrange for the information about the identified candidates to be sent to the Hiring Manager. The Hiring Manager then can view the information in the resume database for the identified candidates and determine whether or not further action will be taken on a specific candidate. The Hiring Manager need not be trained in reading, searching, writing to or any other functions of the resume database, because this function is performed by the trained Recruiter, i.e., someone who is using the system fairly often.

The searching through the resume database 110 to identify potential candidates may be performed by the person or persons who are trained to use the system in the Human Resources group. Efficiencies will be gained because all open requests or positions can be handled through the Human Resources group. The system provides the Hiring Manager with the capacity to review the resumes of persons identified by the Recruiter through easily viewable web pages and is discussed further below.

The flowcharts presented in FIGS. 2-5 represent steps that are performed in accessing the resume database 110 to identify candidates to those who have open positions to be filled.

Figure 2:
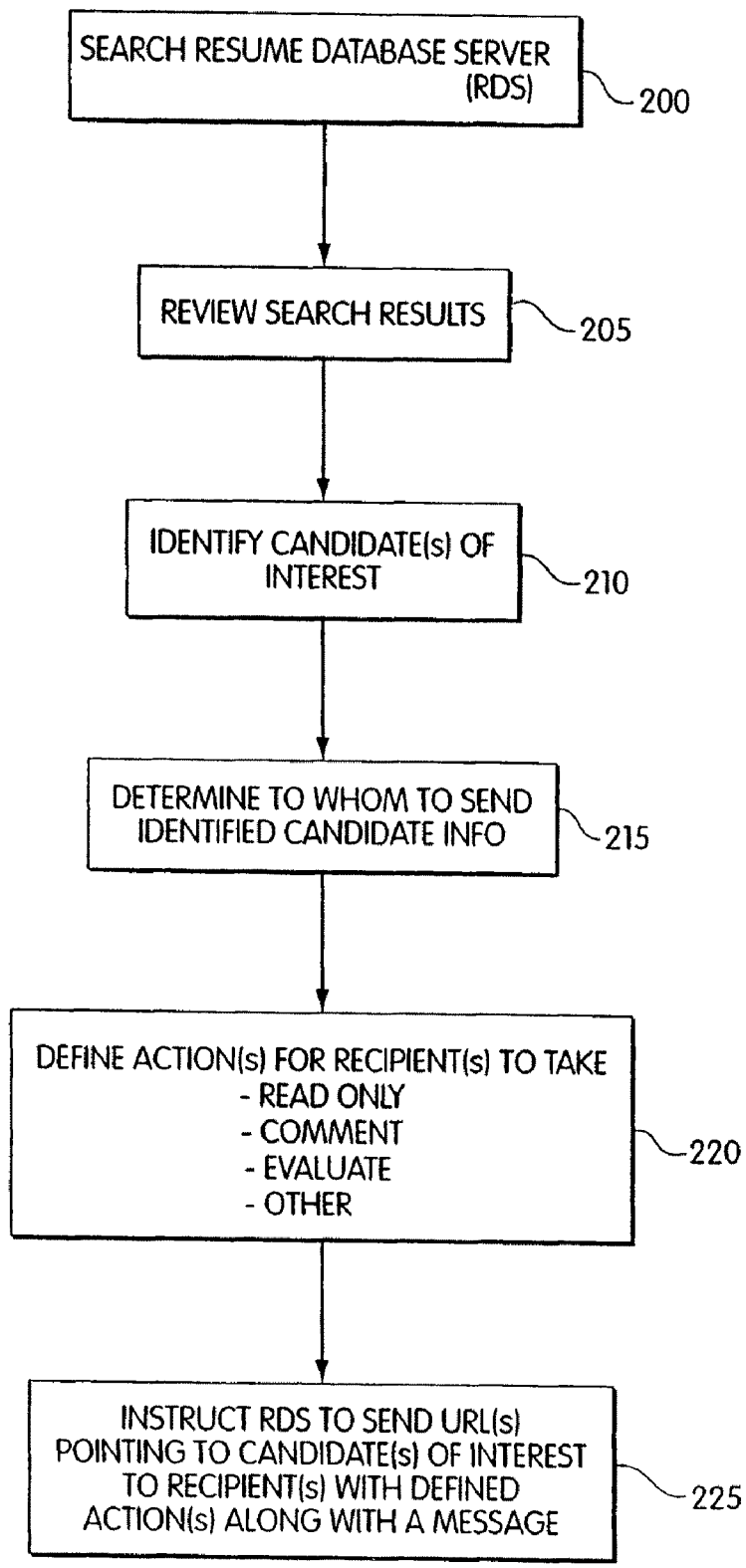
FIG. 2 is a flow chart representing operation of elements of FIG. 1.
Figure 6:
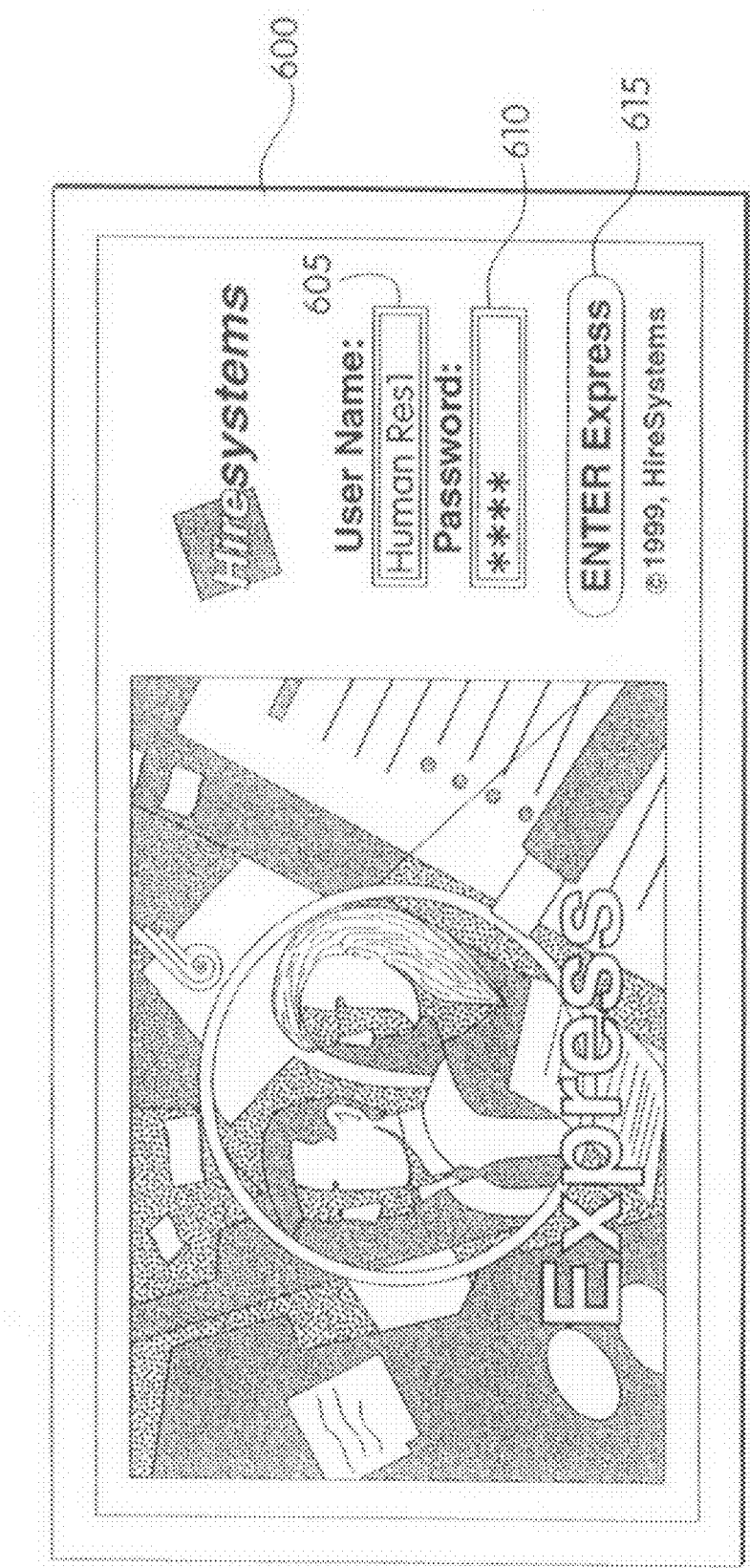
FIG. 6 is an example web page for a client system, such as in FIG. 1.

Referring to FIG. 2, in step 200, a search of the resume database 110 on the resume database server system 105 is initiated. As described above, the Recruiter on the first client system 125 accesses the resume database server system 105 via the network 115. The software operating on the resume database server system 105, upon detecting the access by the first client system 125, causes a program to run that presents a web page 600 on the display of the first client system 125 as shown in FIG. 6. This web page 600 is created via any one of a known number of programs for transmitting documents across the World Wide Web on the Internet using any markup language or mere text characters, e.g., an HTML document.

Because the information in a resume database is sensitive, accesses to the resume database 110 are authenticated. As shown in FIG. 6, a "User Name" field 605 and a "Password" field 610 are presented, initially blank, to the user (in this case the Recruiter in the Human Resources Department). To access the system, the user enters the registered Recruiter name (HumanRes1) and password and then clicks on a button 615 to cause the software running on the resume database server system 105 to determine if it is a valid user name/password combination.

Figure 7:
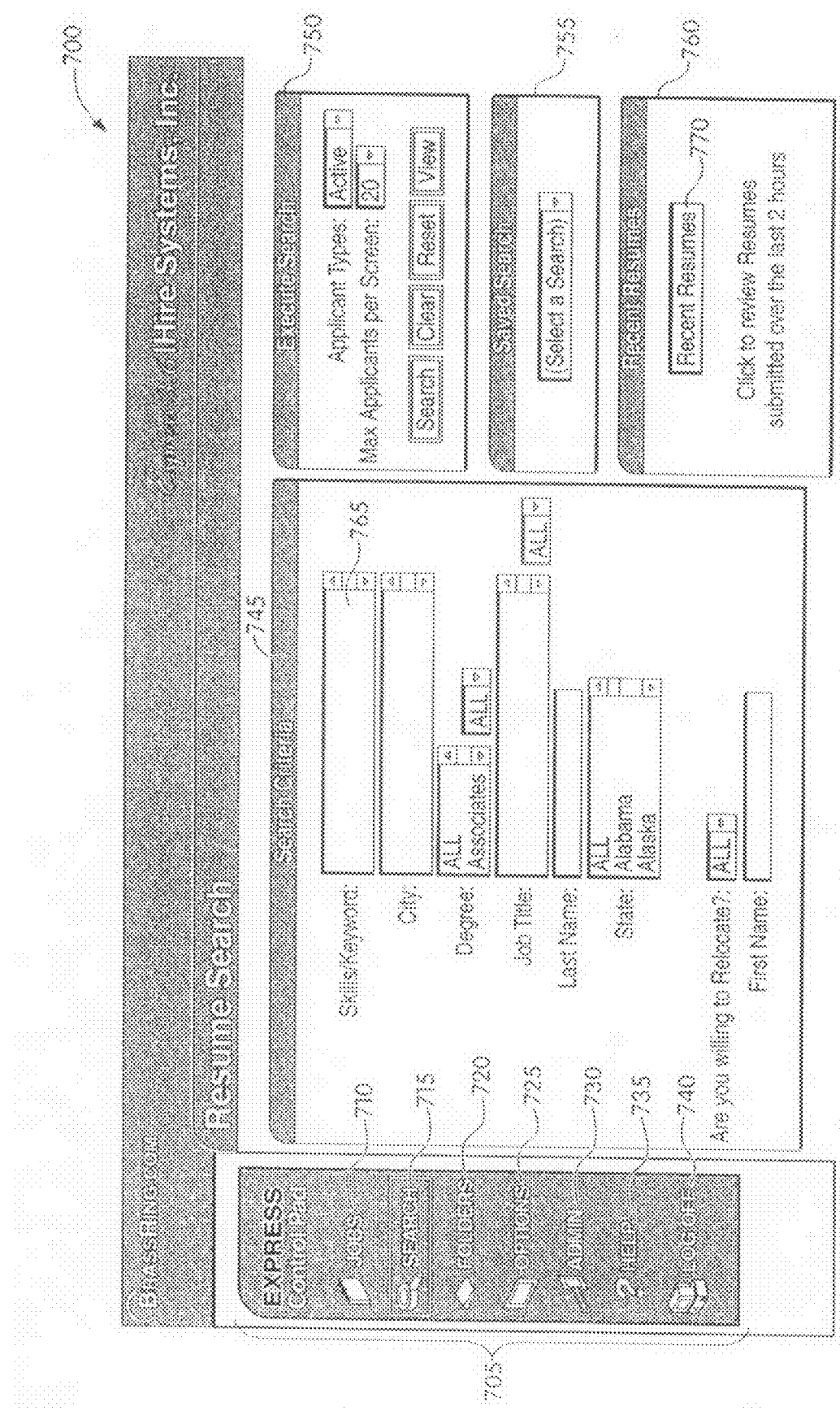
FIG. 7 is an example web page for a client system, such as in FIG. 1.

After the user name/password combination has been verified, a web page 700, as shown in FIG. 7, is displayed on the first client system 125 under control of the program running on the resume database server system 105. The web page 700, once again, an HTML or similarly-featured document, includes a "Control Pad" section 705 including a plurality of selectable buttons 710-740. As shown in FIG. 7, a "Search" button 715 is highlighted. The highlighting and selection of the Search button 715 causes the resume database server system 105 to display a form that facilitates a search of the resume database 110. The form includes a "Search Criteria" block 745, an "Execute Search" block 750, a "Saved Search" block 755 and a "Recent Resumes" block 760. The Search Criteria block 745 includes a "Skills/Keyword" field 765 in which the user, i.e., the Recruiter, can enter words to be used for searching the resumes in the resume database 110. The words that are entered in the Skills/Keyword field 765 are chosen to identify those persons with resumes that list the skills or experience that are needed to fill a currently open job position.

The Execute Search block 750 allows the user to specify the types of job applicants to be searched as well as the number of job applicants per screen to be displayed. A user can also name and save searches by implementing the features of the Saved Search block 755. Thus, when a search is unsuccessful in identifying candidates in the resume database, and needs to be run at a later date, it can be run again without having to re-enter the search criteria. In addition, the search can be set to automatically run, for example, every evening, to determine if qualified candidates have subsequently submitted their resumes to the database.

The Recent Resumes block 760 allows the user to review resumes that have been recently submitted but which may not have been completely processed by the particular resume database software. By clicking on a "Recent Resume" button 770, the user can view the information of recently submitted resumes.

In step 205, the search results are reviewed by the user. As shown in FIG. 8, the resume database server 105 presents, on the display of the first client system 125, a list of candidates that meet the search criteria entered in web page 700, as shown generally in a web page 800. As shown, the document, e.g., any document created by a markup language or plain text, indicates that there are 6,146 total candidates that meet the search criteria. The portion of the web page 800, as shown in FIG. 8, shows twelve out of twenty candidates that can be viewed on a screen. To view the remaining eight candidates, the user would operate a scroll bar 805 as is known from most Graphical User Interface (GUI) applications.

Summary information with respect to each candidate is presented to the user. Two candidate records 810, 815 are identified. The user then can obtain more detailed information from the resume database for any particular record. For example, by clicking on a magnifying glass icon 821, the user will be provided with additional information for the candidate of record 810.

Returning to FIG. 2, at step 210, once the user has reviewed the candidates found by the search and has either reviewed individual records or has refined the search criteria, a final list of candidates of interest is created. Returning to FIG. 8, those candidates of interest can be selected by clicking on a select field, for example, select field 820 and select field 825 for candidate records 810, 815, respectively. The action of clicking on the select fields 820, 825 causes a checkmark to be placed therein and a count to be placed in a "Candidates Selected" box 824. It should be noted that the operation of, for example, placing checkmarks in the boxes or obtaining additional detailed information for a particular candidate by clicking on the detail icon 821, is performed under the control of the software program running on the resume database server system 105 in conjunction with the browser software running on the first client system 125.

After the candidates of interest have been identified in step 210, the Recruiter identifies the person or persons to whom the potential candidate's information should be sent at step 215. At step 220 the Recruiter defines the actions for the recipient(s) to take with respect to the forwarded candidate information. At this point, the Recruiter can choose to allow the recipient, e.g., the Hiring Manager, to 1) have read only access to some or all of the information about the candidate, e.g., access to work experience but no access to the names of references, 2) provide comments on each candidate that will be placed in the resume database and associated with that candidate, 3) fill out a form evaluating the candidate that will also be placed in the resume database and associated with that candidate, 4) review comments submitted by others, or 5) perform any other action that might be defined for either a specific job opening, work group or location. Of course, these are only examples of actions that the Recruiter can set for the Hiring Manager to take and are not intended to be limiting.

After the Recruiter has identified the action or actions the Hiring Manager should take, the resume database server 105 is instructed to send an e-mail message to the Hiring Manager that includes a Uniform Resource Locator (URL) that points to the candidate's resume record along with references to the form or forms that are to be completed at step 225. A URL is a standard way that has been developed to specify the location of a resource that is available electronically. A URL is most commonly used when using a World Wide Web (WWW) client to link to WWW pages. The first part of the URL identifies the protocol that is being used. Typically, in WWW applications, HyperText Transfer Protocol (HTTP) is commonly used. In addition, one application of a URL is a hyperlink. A hyperlink is an element in an electronic document that links to another place in the same document or to an entirely different document. Typically, a user clicks on the hyperlink to follow the link.

Figure 9:
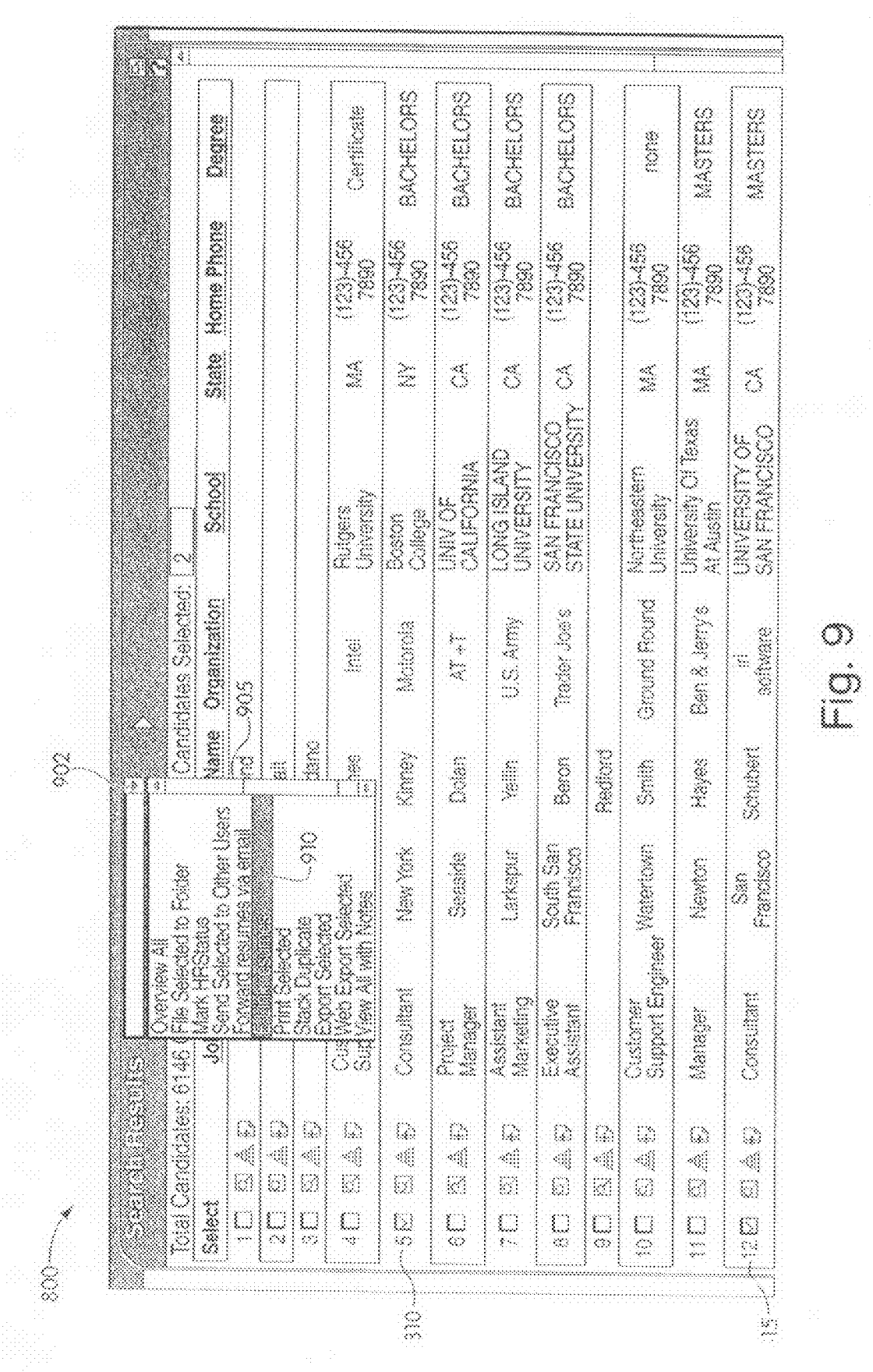

As shown in FIG. 9, when the Recruiter has identified candidates of interest (step 210) and determined to whom to send the candidate information (step 215) and defined the actions for the recipient to take (step 220), the Recruiter may click on an "Expansion" button 902 to be presented with a selection frame 905 from which various actions can be selected by the Recruiter. An "E-link resumes" selection 910 allows the Recruiter to instruct the resume database server 105 to send resume data to the Hiring Manager.

Figure 10A:
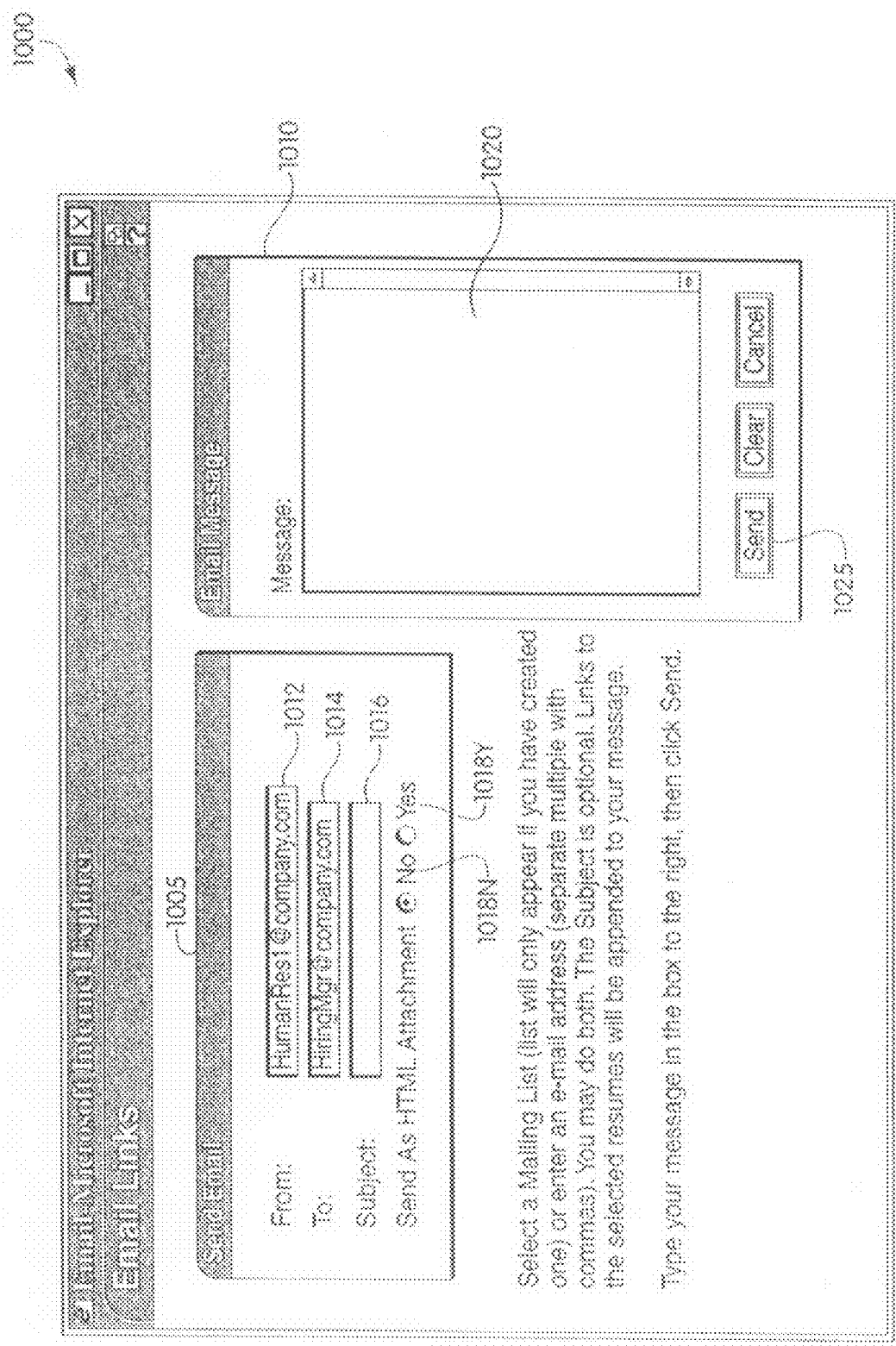
FIG. 10 is an example web page for a client system, such as in FIG. 1.

After the resume database server 105 receives an indication from the Recruiter on the first client system 125 that resume information is to be sent to another, a web page 1000, as shown in FIG. 10, is presented to the Recruiter on the display of the first client system 125. The web page 1000 includes a "Send Email" block 1005 and an "Email Message" block 1010 for the Recruiter to complete. The Send Email block 1005 includes a "From" field 1012, a "To" field 1014, a "Subject" field 1016 and two "HTML Attachment" buttons, 1018N, 1018Y.

As a default, an e-mail address associated with the user name entered in User Name field 605 (FIG. 6) is displayed in the From field 1012. The Recruiter can overwrite this default field with a different e-mail address. At least one e-mail address is entered by the Recruiter in the "To" field 1014. More than one e-mail address may be entered in the To field 1014 when separated by a predetermined character, e.g., a space, a comma, or semi-colon. If the Recruiter so desires, a descriptive message, e.g., a reference to the job opening or job code associated therewith, may be entered into a "Subject" field 1016.

A URL pointing to the identified resume data in the resume database 110 is sent to each of the one or more recipients. The Recruiter chooses to either send the URL as an HTML attachment to the e-mail by clicking on the "Yes" button 1018Y or embedding it in the e-mail message by clicking on the "No" button 1018N.

If so desired, the Recruiter can type in a message in a "Message" field 1020 that is part of an "Email Message" block 1010. When everything has been completed, the Recruiter need only click on a "Send" button 1025.

Figure 10B:
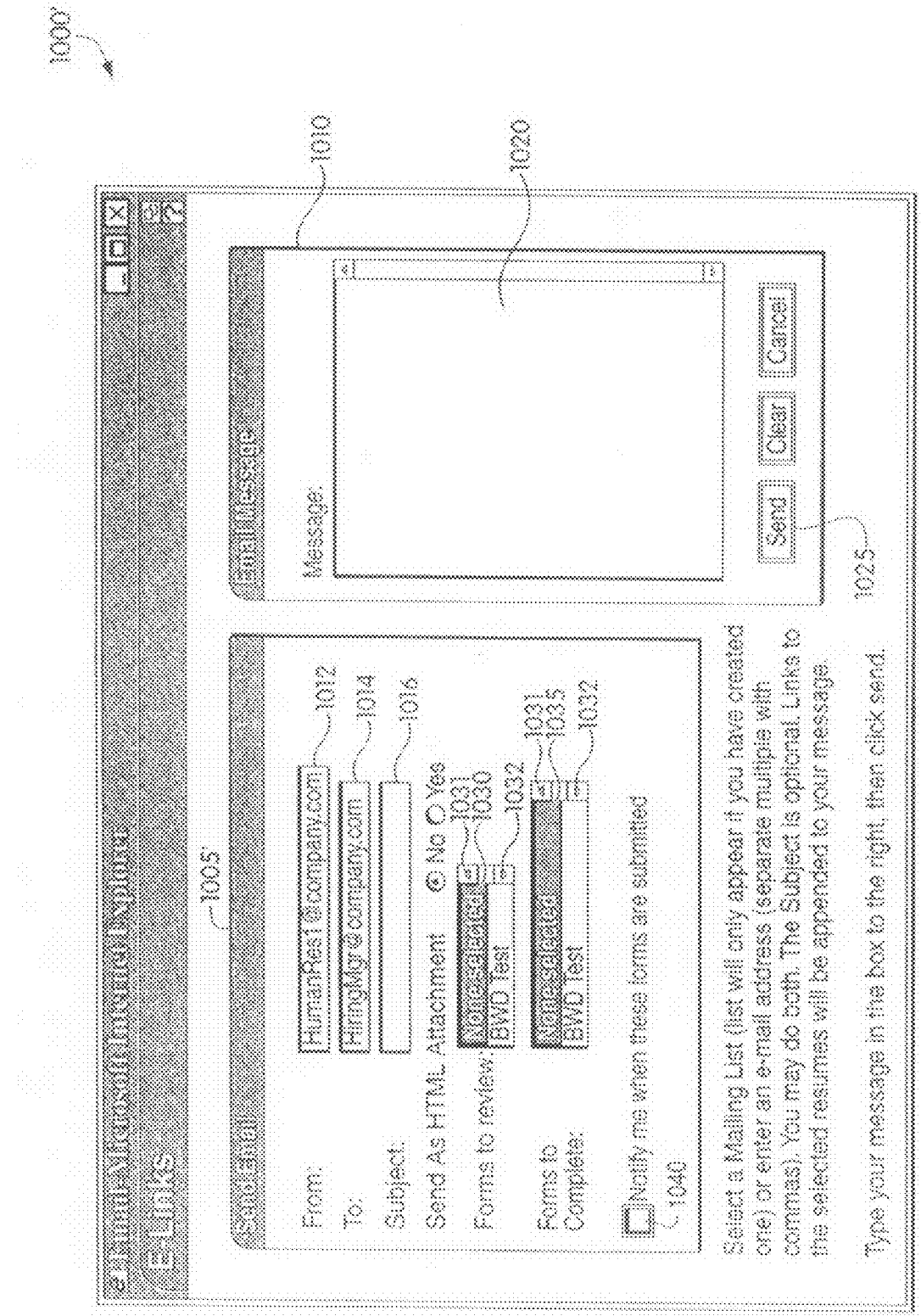

As described above, the Recruiter can choose to have the recipient, e.g., the Hiring Manager, either review forms associated with each candidate's resume information that have been completed by others or have the Hiring Manager complete a new form to be associated with the candidate's resume information. As shown in FIG. 10B, a web page 1000' has a layout similar to screen 1000 in FIG. 10A. A "Send Email" block 1005', however, includes a "Forms to Review" field 1030 and a "Forms to Complete" field 1035. The Recruiter clicks on the up and down arrows 1031, 1032 associated with each of the fields 1030, 1035 to choose different forms to be reviewed by the Hiring Manager or to choose different forms to be completed.

If multiple forms are either to be reviewed or completed, the forms can be chosen as is known in other graphical user interface programs, e.g., holding down the control key while clicking on the item or items with the mouse. After the forms to be reviewed and the forms to be completed are chosen, the Recruiter can choose to be notified when the forms are submitted by checking a "Notify" box 1040. Thus, after a form is completed by the Hiring Manager, the Recruiter receives a copy of the information that has been placed into the completed form by the Hiring Manager. After these choices have been made, the Recruiter may click on the Send button 1025.

In addition to identifying one or more forms for the recipient to complete, the sender (i.e., the Recruiter) can also establish an expiration time for the URL. This expiration time can either be based on an absolute date and time for the URL to expire or can be relative to the first time that the URL is accessed. For example, the resume database system 105 may be instructed to inactivate the URL five days after it is first sent or five days after it is first accessed. Instead of using a duration, the sender also may establish a date and time certain for the link to expire. The sender also may instruct the resume database system 105 to allow access to the resume record only a set number of times and thereafter disable the link. Finally, the system can be instructed to notify the sender when the recipient has not accessed the URL some predetermined amount of time after the e-mail message has been sent. By being notified that a candidate's URL has not been accessed, the Recruiter can take alternate measures to assure that qualified candidates are not missed.

As has already been described, the resume database server 105 and the first client system 125 may operate in a client-server relationship. Specifically, the resume database 110 is connected to the resume database server 105 to which the first client system 125 communicates via a computer network. The resume database software resides on the server system 105 and controls the display of the first client system 125 with respect to its interaction with the resume database software and database 110. Thus, the Recruiter on the first client system 125 is instructing the resume database server 105 to send information to a recipient. This system causes the transmitted message to the recipient, i.e., the Hiring Manager, to appear to be coming from the Recruiter whereas, in actuality, it is being sent on behalf of the Recruiter from the resume database server system 105.

Figure 3:
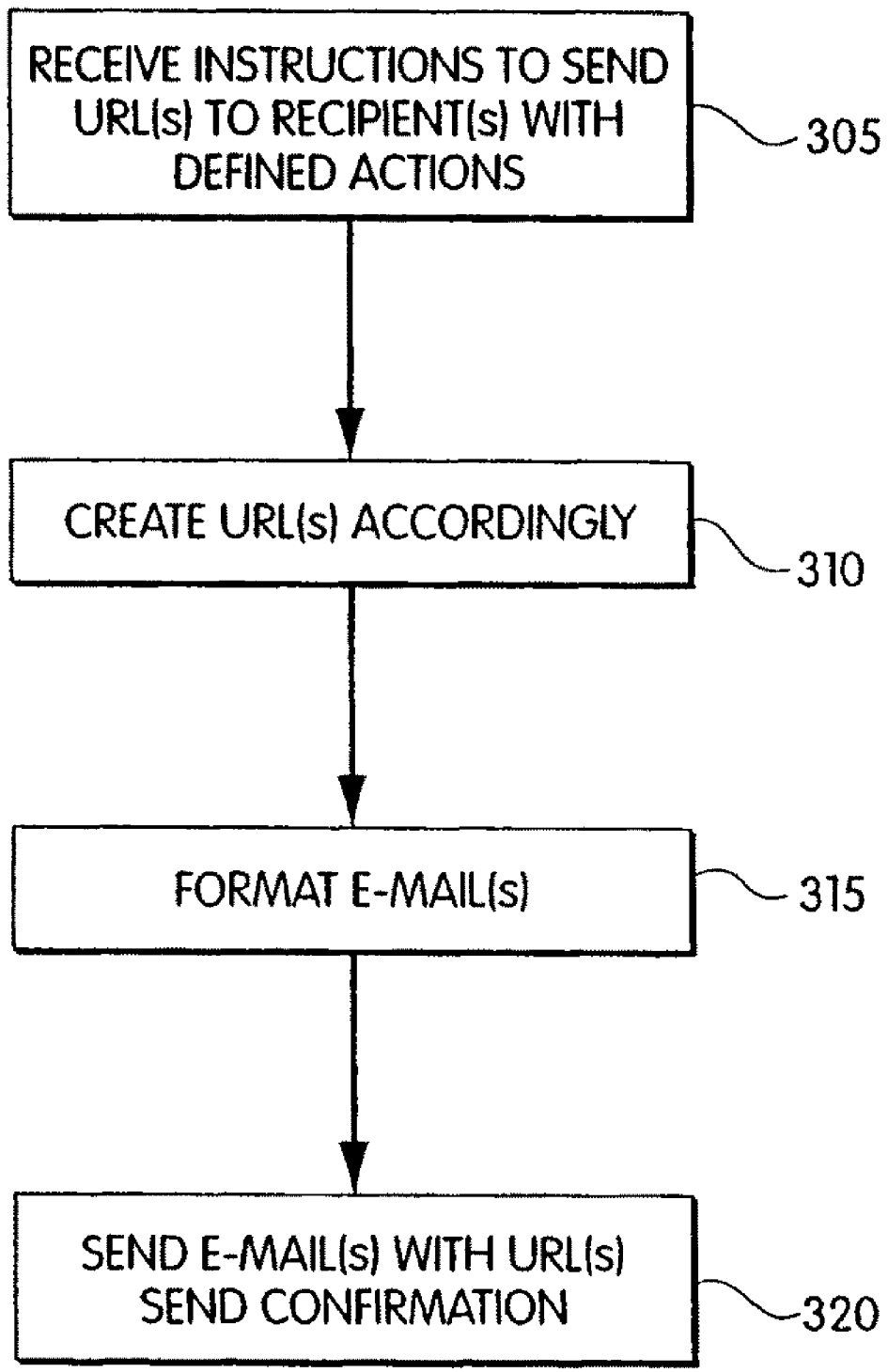
FIG. 3 is a flow chart representing operation of elements of FIG. 1.

Referring to FIG. 3, the steps that are implemented in the resume database server system 105 will now be described. At step 305, the resume database server 105 receives the instructions to send an e-mail with at least one URL to at least one recipient as defined by the Recruiter on the first client system 125 at step 225 in FIG. 2. The resume database server may implement the resume database 110 with a relational database accessed by SQL. Any one of a number of commercially available relational databases and languages can be used, for example, Microsoft SQL Server 7.0. As is known, a relational database implements a number of tables that are cross-referenced by one or more indices.

In one implementation of the resume system, in response to receiving the instructions to send the URL, the resume database server program implements several SQL relational database transactions involving two tables: 1) a "Notes" table 1100, as shown in FIGS. 11, and 2) an "Email Transactions" table 1200, as shown in FIG. 12. Notes table 1100 includes a "Resume_Key" column 1102, a "Date/Time Sent" column 1104, a "Date/Time Opened" column 1105, and an "Email Destination" column 1106. Each instance of sending a URL, in response to a communication received from the Recruiter, causes an entry to be placed in the Notes table 1100 by the resume database server system 105. In one implementation, each resume in the resume database 110 has assigned to it a unique Resume_Key value. Thus, for example, entry 1108 includes the Resume_Key=14888 identifying a specific resume record, where the URL was sent on Feb. 29, 2000 at 10:00:00 in the morning to the e-mail destination HiringMgr@company.com.

The Email Transactions table 1200 includes a Resume_Key column 1202, an E-Link_Key" column 1204, a "Date/Time Sent" column 1206, an "Email Destination" column 1208 and a "Sender_ID" column 1210. The Resume_Key is the same key as that found in Resume_Key column 1102 in the Notes table 1100 and functions as an index. The E-Link_Key is a randomly generated number that is used for security purposes as will be described further below. The Date/Time Sent and the E-mail Destination information are the same as that already described with respect to the Notes table 1100. The Sender_ID information records the identification of the user who directed the sending of the URL.

In operation, when the resume database server 105 receives the instructions from the Recruiter on the first client system 125 to send the link to an e-mail destination, i.e., the Hiring Manager, entries are made in the Notes table 1100 and the E-Mail Transactions table 1200. As an example, entry 1108 includes Resume_Key=14888 with the Date/Time Sent=20000229100000 and the E-mail Destination=HiringMgr@company.com. An entry 1212 in the E-Mail Transactions table 1200 has a Resume_Key=14888, an E-Link_Key=769336409, Date/Time Sent=20000229100000, an E-Mail Destination=HiringMgr@company.com, and a Sender_ID=HumanRes1. Similarly, the entry 1110 in Notes table 1100 parallels the entry 1214 in E-Mail Transactions table 1200.

Returning to FIG. 3, at step 310, the resume database server creates a URL to link to the resume record. As shown in FIG. 13 a first URL 1300 is created with respect to entry 1108, as shown in Notes table 1100. URL 1300 includes a location portion 1304 identifying the location on the World Wide Web of the resume database server 105, and an encoded portion 1306. The encoded portion 1306 encodes the Resume_Key value and the E-Link_Key value that is assigned to each URL such that it cannot be ascertained without knowing the scheme that was used to encode the information. If there are two or more recipients, each recipient receives a different URL that has a unique E-Link_Key value although each URL points to the same resume information. This unique E-Link_Key value allows the system to identify when a particular recipient is accessing the resume database since the unique identifier is associated with the recipient's URL.

Another table, not shown, is used to store information regarding the actions to be taken by the recipient. Each entry in the table would correspond with the Resume_Key and the E-Link_Key pair of the URL that has been transmitted. This table would store, for example, an indication of the notes that the recipient is allowed to access along with the forms that are to be completed.

Figure 14:
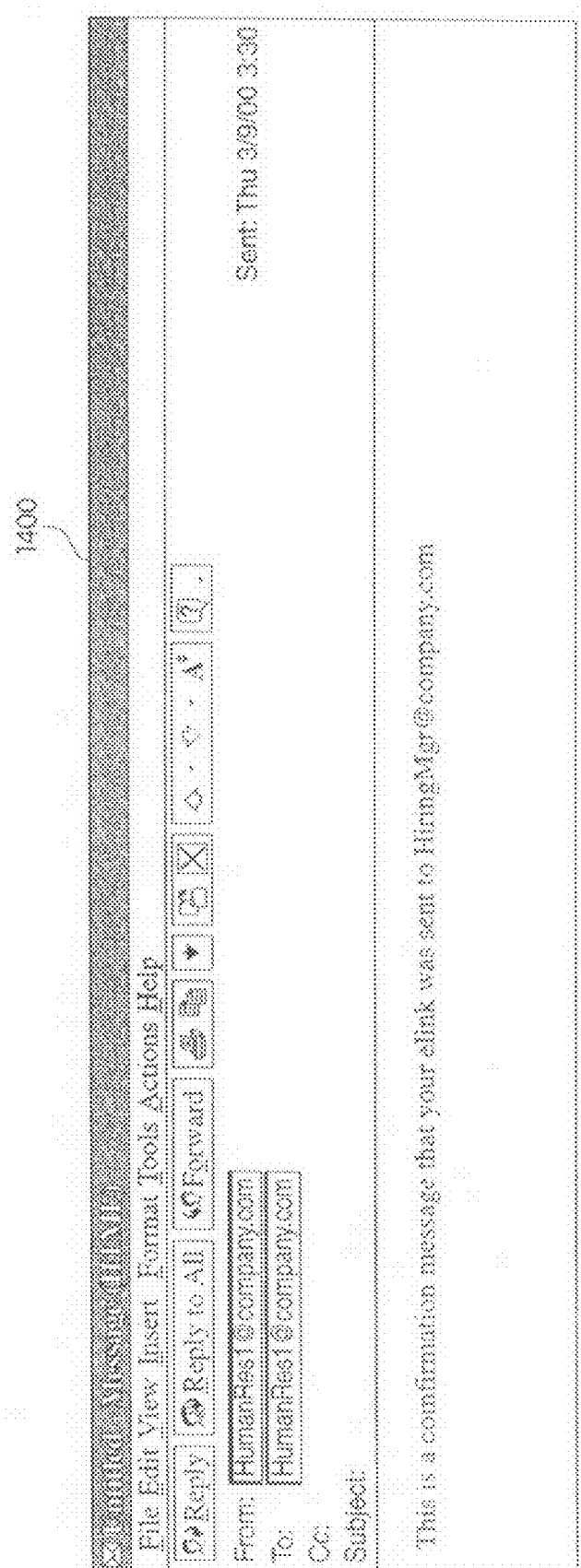
FIG. 14 shows a confirmation message according to one aspect of the example resume system.

The resume database server 105 formats (step 315) the e-mail for delivery to the destination or destinations and then, at step 320, implements its e-mail program to send the e-mail with the URL and then also sends a confirmation message 1400, as shown in FIG. 14, to the Recruiter. The e-mail program can either be running on the resume database server 105 or running on a separate e-mail server associated with the resume database server 105 and dedicated to sending and receiving e-mail messages.

Figure 15:
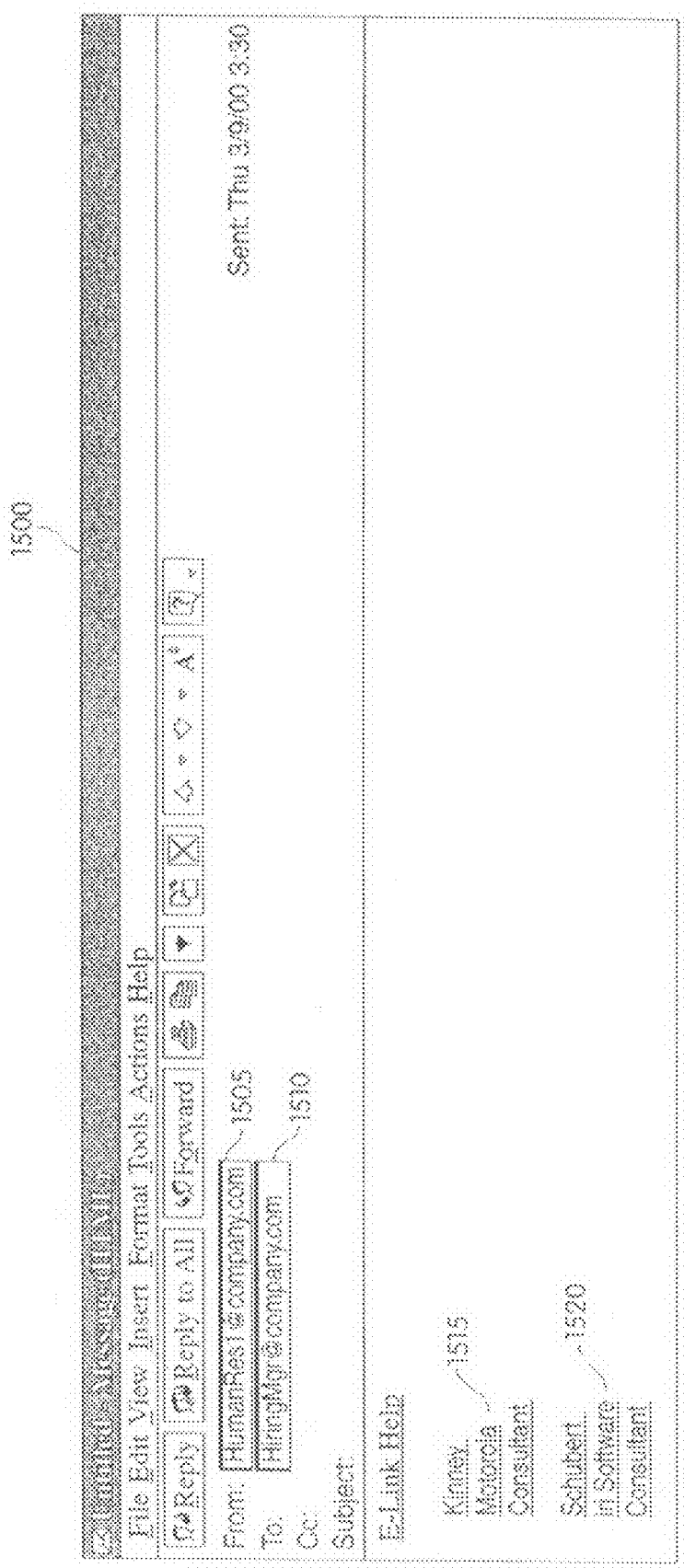
FIG. 15 shows a received e-mail message according to one embodiment of the example resume system.

An e-mail message 1500 received by the Hiring Manager is shown in FIG. 15. The message 1500 indicates from whom the message originated in a "From" field 1505 and to whom it has been sent in a "Destination" field 1510. As above, the e-mail appears to have been sent by the Recruiter, however, it was sent from the resume database server system 105 and not from the client system 125. Two URLs 1515, 1520 that link to the candidate resumes 810, 815, respectively, from FIG. 9, are found in the body of the e-mail message 1500. In one embodiment, the URLs 1515, 1520 are presented as hyperlinks that indicate the last name of the candidate, the current or last employer as well as the current or last position as is stored in the resume database. Of course, this can be changed as is necessary. In response to receiving the e-mail, the Hiring Manager would then access the resume database for the resume information that has been forwarded to him or her by clicking on each of the URLs 1515, 1520.

Figure 4:
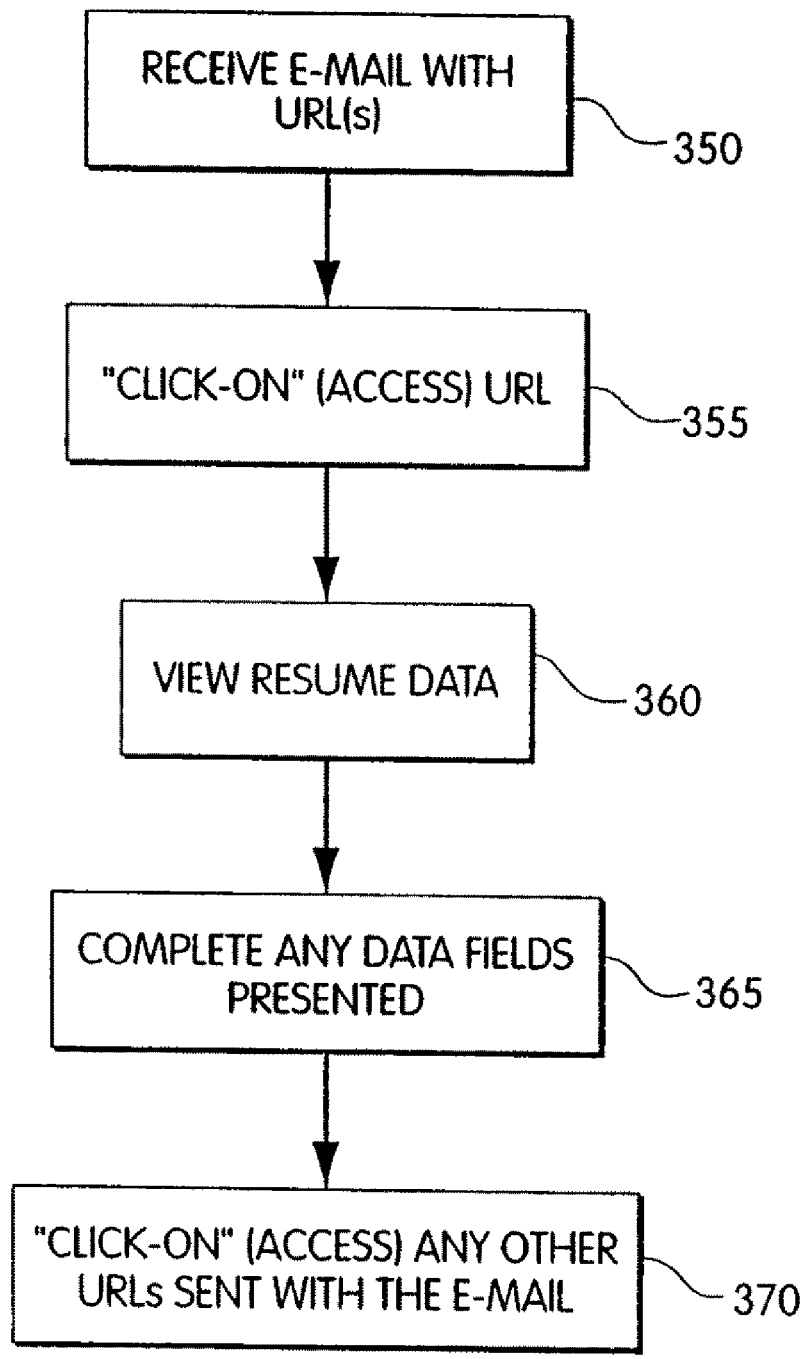
FIG. 4 is a flow chart representing operation of elements of FIG. 1.

The steps implemented by the recipient of the URL are represented in the flowchart of FIG. 4. At step 350, the recipient, i.e., the Hiring Manager on a second client system 135, receives the e-mail with at least one URL. To access a URL, the recipient clicks on it at step 355. At step 360, the resume data is transmitted from the resume database server system 105 and presented on the second client system 135 where the Hiring Manager is located. The Hiring Manager then completes the data fields of forms that have been presented to him or her for completion at step 365. Finally, at step 370, the recipient clicks on, i.e., accesses, any other URLs that have been sent with the e-mail, for example, general instructions, reminders and/or messages.

Figure 5:
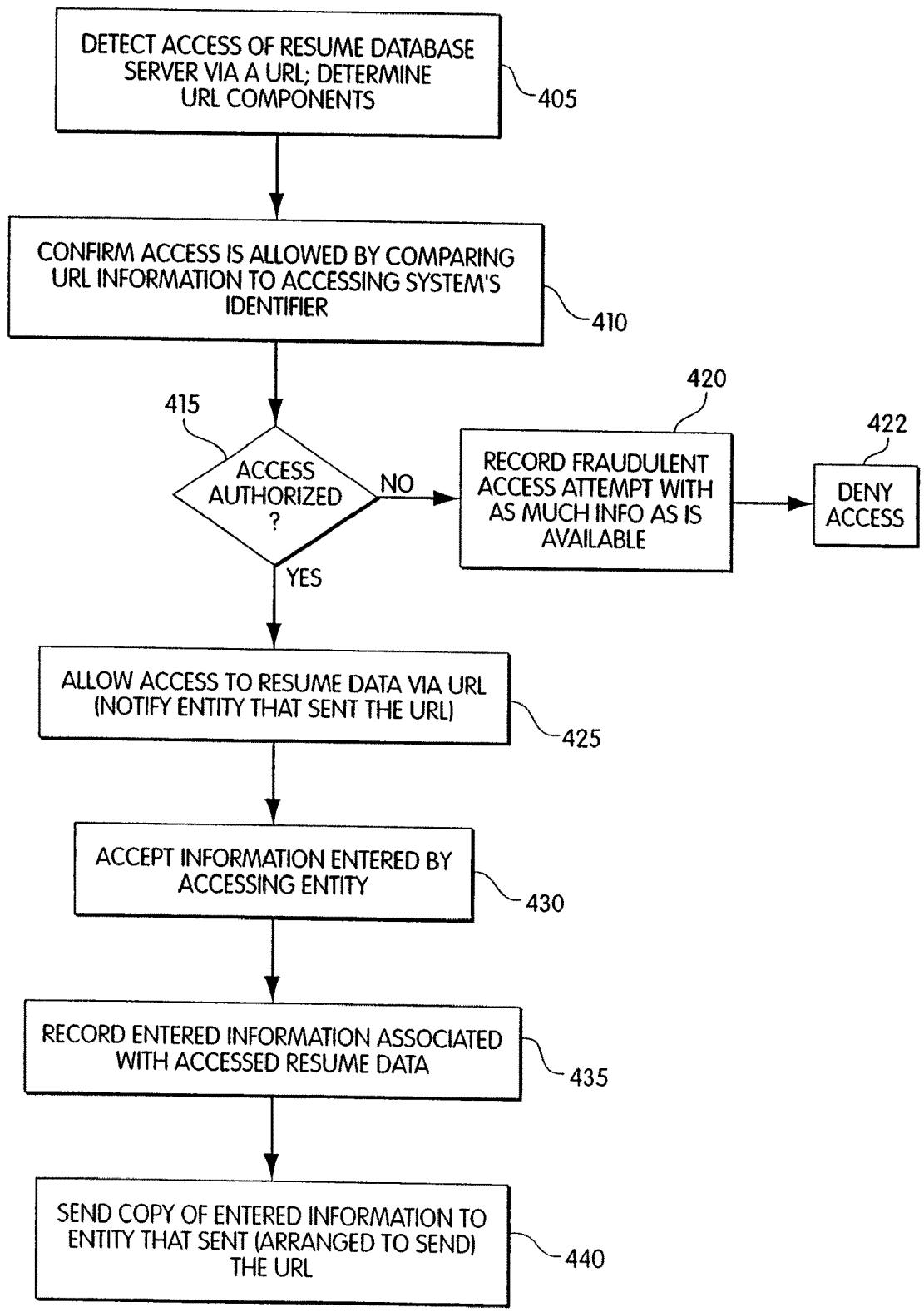
FIG. 5 is a flow chart representing operation of elements of FIG. 1.

When the Hiring Manager clicks on, for example, the URL 1515, the resume database server 105 detects access of the system via the URL in step 405, as shown in FIG. 5. The components of the URL are then identified by the resume database server system 105. Because confidentiality and privacy are key requirements of a resume database system, it cannot be assumed that the portions of the URL are legitimate. To preserve confidentiality and prevent fraudulent access to the resume database, the resume database server 105 confirms, at step 410, that access is allowed by comparing portions of the URL 1515 to data stored in the database. Specifically, the portion 1306 is decoded to determine the Resume_Key portion value and the E-link_Key portion value and are checked to determine if there is a corresponding entry in the E-Mail Transactions table 1200 for the pair.

At step 415, the access is verified. If the URL is found to be fraudulent then, at step 420, the system will record as much information as is available about the attempted fraudulent access to identify an individual or individuals who is attempting to improperly access the resume database. At step 422, because the access has been determined to be fraudulent, the URL would be directed to a message indicating that access has been denied.

Returning to step 415, if the URL is verified as being valid, control passes to step 425 where access is allowed to the resume database system 105 via the URL. The URL access by the Hiring Manager to the resume database is accomplished without the need for a username/password pair combination. Authorization is based on the information in the URL matching information in the E-Mail Transactions table 1200. Only those users who will be searching the database (and have received the necessary training) will be provided with a username and a password which simplifies operation of the system. When the resume database is accessed, the Notes table 1100 is updated for the appropriate record to indicate the date and time that the information was accessed in the Date/Time Opened column 1105.

With respect to the tables represented in FIGS. 11 and 12, one of ordinary skill in the art of creating and managing relational databases would understand that there are many different ways in which the tables can be established and/or structured to accomplish the same function as described herein. It is understood that the tables described in FIGS. 11 and 12 are representative only and are not limiting.

Figure 16:
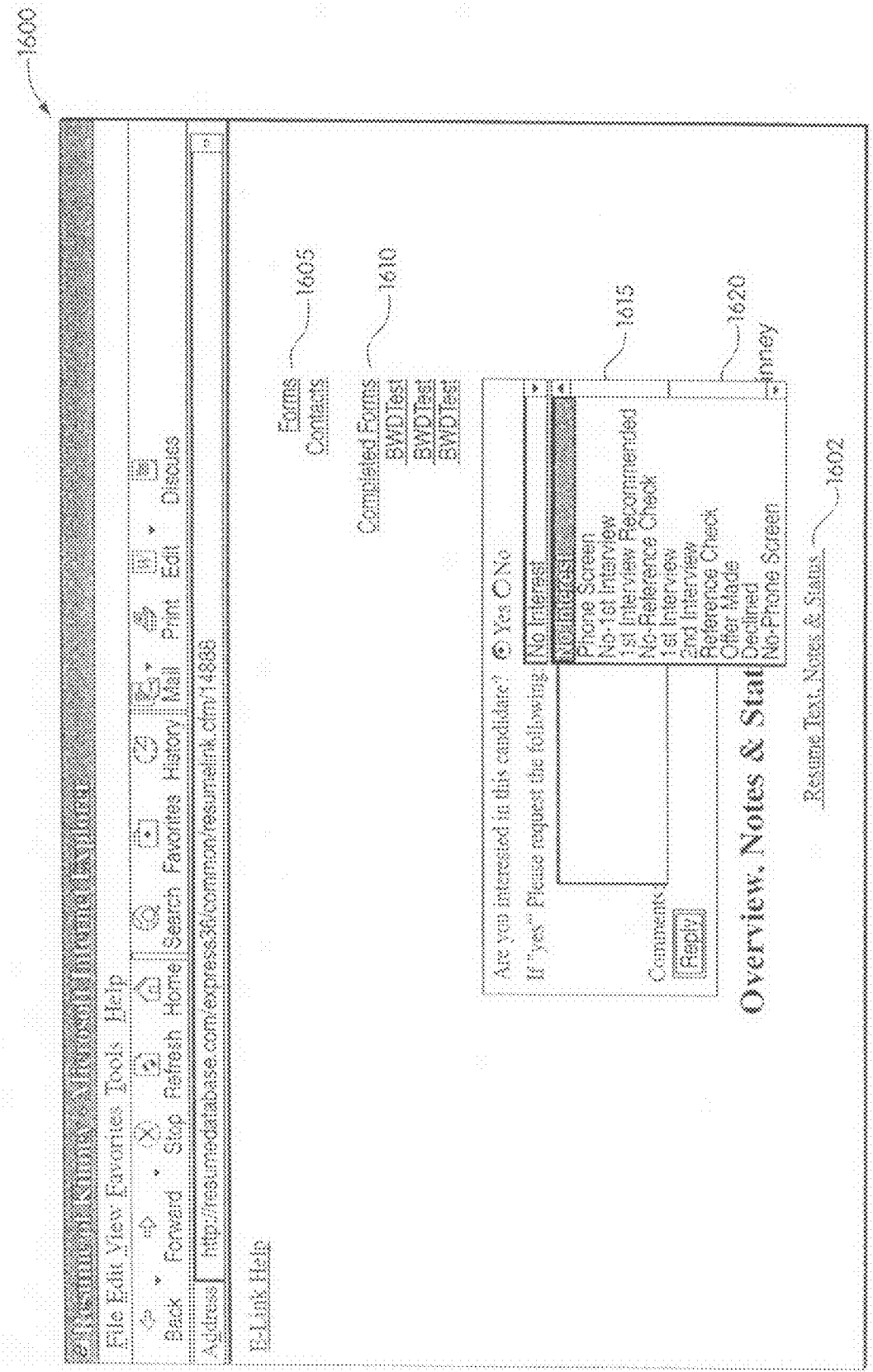
FIG. 16 shows a resume viewing web page according to the example resume system.

As shown in FIG. 16, the Hiring Manager would be presented with a web page 1600 including a "Resume Text, Notes & Status" link 1602 to the candidate resume information, a "Forms" links 1605 to forms that need to be completed and a "Completed Forms" link 1610 to forms that have already been completed for the particular candidate. An "Interest" section 1615 also is presented to the Hiring Manager for completion. In this case, the recipient, i.e., the Hiring Manager, would indicate whether or not there is interest in this candidate. If interest is indicated, then a pull-down menu 1620 can be selected and a number of different choices reviewed and one of them chosen to indicate what a next course of action should be.

An example of an additional form to be completed by the recipient is shown in FIG. 17. Form 1700 is presented to the recipient for completion of one or more fields 1705, 1710 and 1715, for example.

Figures 18, 19:
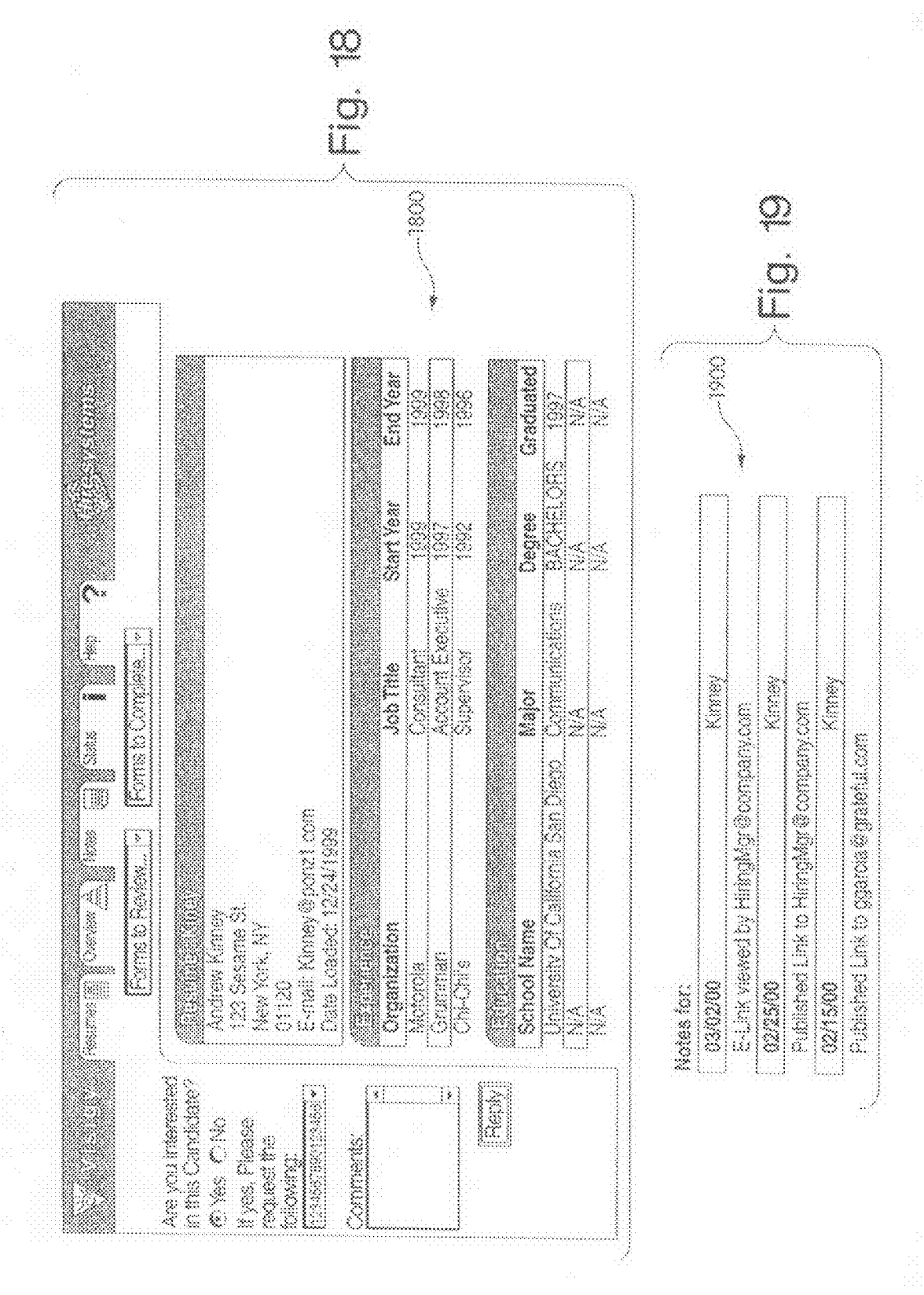

FIGS. 18 and 19 show alternate formats for presenting resume information and notes to a recipient.

The format or layout of the display that is presented to a specific recipient is determined at the time that the resume database is accessed via a URL. The present invention does not need to pre-form the format of a document or screen for presentation to all recipients. The format of the information is determined at the time that the database is accessed via the URL and depends upon the criteria established for the URL. Specifically, factors such as whether or not additional forms are to be filled out by the recipient, or viewed by the recipient, or a combination thereof, are considered when determining the format. These factors provide the system with the flexibility and quicker response time that make this system easier to use.

In the example described above, the e-mail message presented the URL to the recipient for accessing the resume information. In an alternative method, the e-mail message can be formatted as a full HTML document to present the resume information in an easily viewable form. The HTML document may include an embedded Javascript program to notify the resume database system when the document has been accessed by the recipient. The information can be presented to the recipient without having to access the web browser and tracking information can still be obtained.

Further, any forms for the recipient to complete can be presented as an HTML page. When the recipient completes the form, typically a "Submit" button will be clicked to signal such completion. The Submit button would then call an HTML form submission routine which is a message to call a URL, thereby providing the information in the completed form to the resume database.

As has been described, in one embodiment the Hiring Manager receives an e-mail that has multiple URLs attached. Each URL is identified by a name of a candidate and links the Hiring Manager to the particular candidate's information in the resume database 110.

Figure 20:
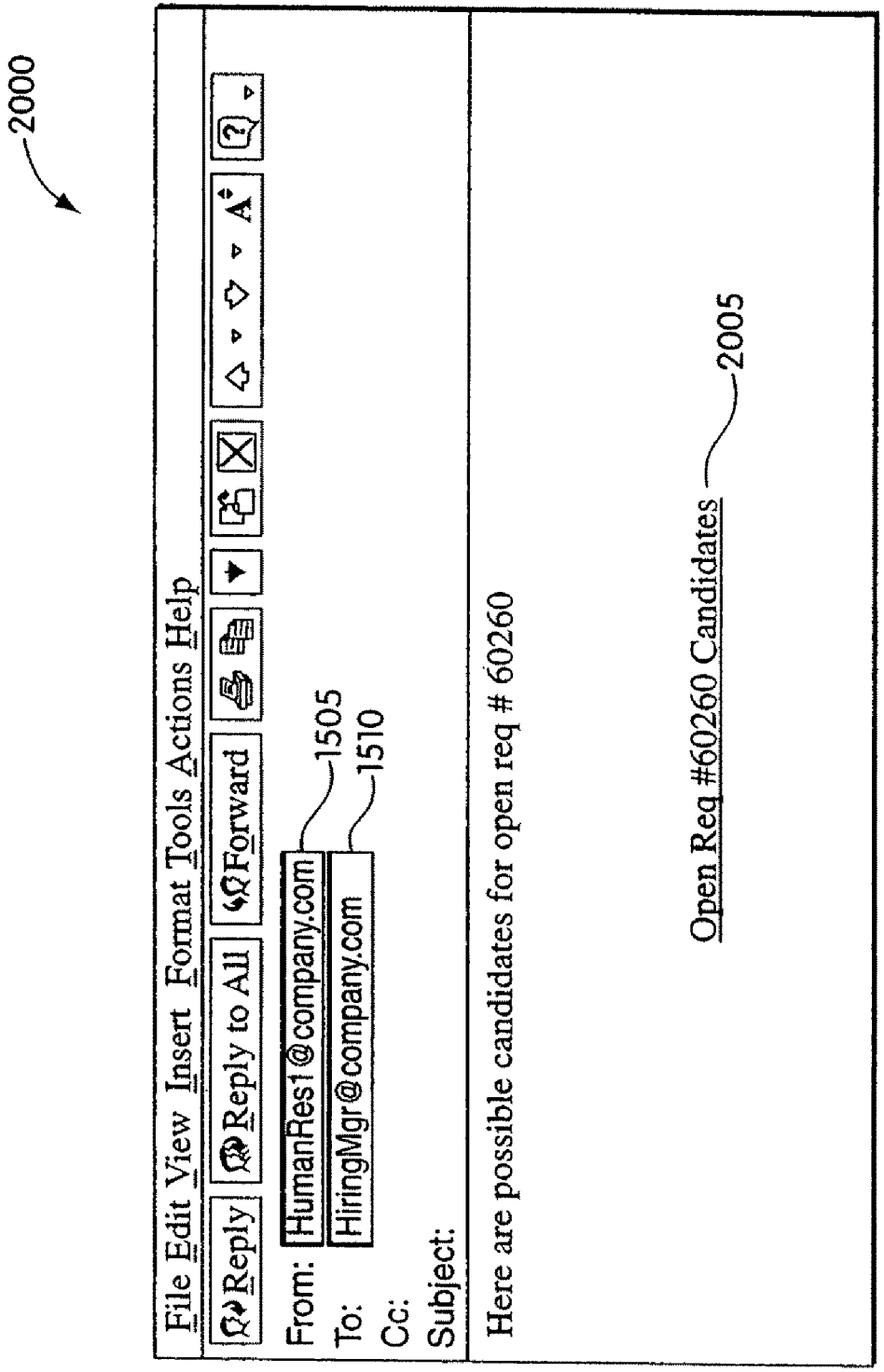
FIG. 20 is an alternate version of an e-mail according to another aspect of the example resume system.

The Hiring Manager, instead of receiving multiple URLs, may receive an e-mail message 2000 with only one URL 2005 as shown in FIG. 20. A single page pointing to multiple candidates would be advantageous when there is a large number of candidates to review.

Figure 21:
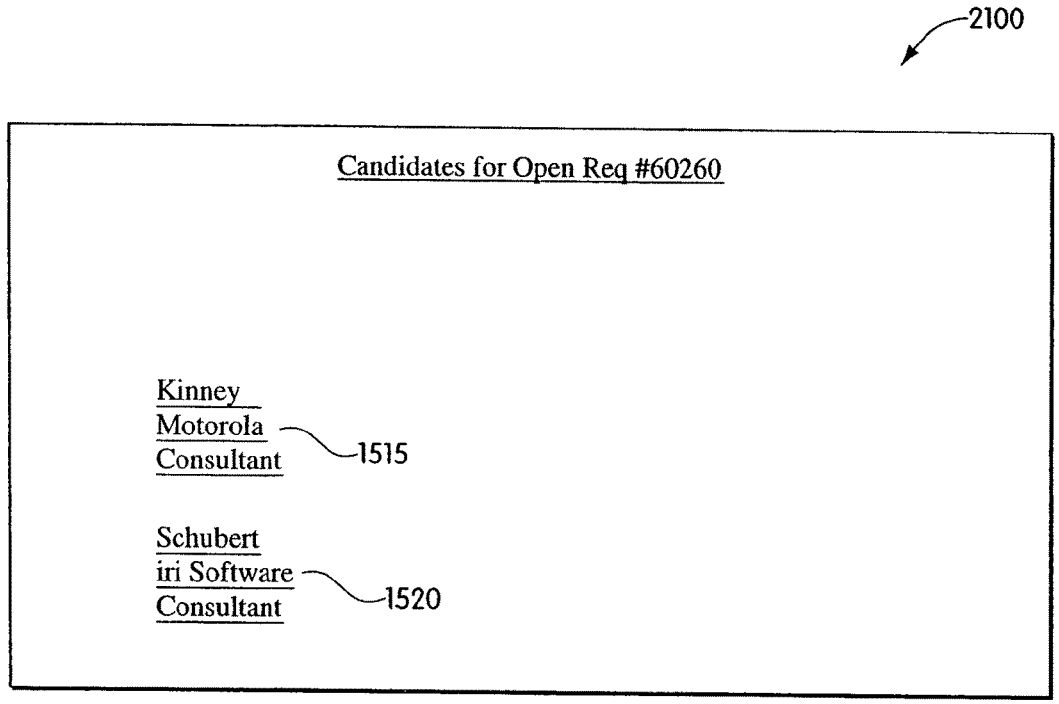
FIG. 21 shows an alternate format for presenting resume URLs.

If the Hiring Manager "clicks" on URL 2005, he or she is directed to a web page 2100 on the resume database server 105, as shown in FIG. 21. At this web page 2100, the URLs 1515, 1520, previously described, can be presented and accessed in a manner similar to that which has already been described.

Having multiple URLs on one page allows the Hiring Manager to use the browser software to access the links 1515, 1520 and there is no need to return to the e-mail program to access the next URL. Some browser programs also can be configured to change the display for URLs that have already been accessed, e.g., from black to blue, which provides a visual cue for the Hiring Manager to identify the resumes that have already been viewed.

Because the resume database server 105 controls the screen display 2100, a URL can be removed from the page whenever necessary. Similarly, new URLs can be added to the page 2100 between viewings by the Hiring Manager if new candidates that match the search criteria have been added to the resume database. In an intranet application, the page that this URL points to could be regularly updated with search results.

In an alternate embodiment, each of the communications channels 120, 130, 140 is a wireless connection to the network 115. In addition, hand-held wireless devices such as Personal Digital Assistants (PDAs) or telephones with micro web browsers can replace the client systems 125, 135 and receive the e-mails with the URLs to the resume information attached thereto. These devices could then be used to access the resume information in the resume database. Of course, the format of the information for display on a hand-held device would differ from that meant to be displayed on the monitor of a desktop or laptop computer with a larger screen. In addition, the keypad on a hand-held device, especially a phone, will limit the amount and type of information that can be entered by the recipient.

As there is no way to know exactly how a recipient will be accessing e-mail, one example of the present invention will send multiple URLs for the same resume information. One URL will be directed to being viewed on a standard monitor with a fully enabled web browser and will be labeled as such. The other may be labeled as accessible via a hand-held device operating a micro web browser or equivalent. The latter URL would be configured to operate in conjunction with the hand-held device and can, for example, accept input via the keyboard, e.g., "press 1 to arrange a follow-up interview, press 2 to indicate no interest, press # to exit." Sending the URL in multiple formats allows the Hiring Manager to view the resume information from, for example, the micro web browser on the wireless phone to see if immediate action on a candidate is warranted. If such action is warranted, then the Hiring Manager can indicate accordingly. If the matter is not urgent, the Hiring Manager can then access the same data upon returning to the desktop or laptop computer via the alternate URL that is provided.

In the example system described above, the Recruiter runs a search to identify a candidate for an open position and then arranges for a URL to the candidate's resume information to be sent to the Hiring Manager. Alternately, the search can be defined and set to run automatically on a pre-set schedule, for example, each night. This "Automated Agent" then sends to the Hiring Manager URLs to any resumes that match the search criteria according to the instructions set in the search. Once the Hiring Manager receives the URL, operation of the system proceeds as has been described above.

As resume information is placed in the resume database, it can be compared to the stored searches. If there is a match between the candidate's credentials and the search criteria, a URL will be transmitted to the Hiring Manager. Thus, as soon as a candidate that matches a job opening's needs is entered in the database, the appropriate Hiring Manager will be notified. Being able to quickly identify and contact qualified job applicants can increase the chances of hiring the individual and filling the open job position.

In some cases, a candidate who has submitted his or her resume to the database may decide to withdraw it. If this withdrawal occurs, then all outstanding links that reference this resume would be disabled. Thus, no time will be wasted by a Hiring Manager in reviewing a candidate when the candidate is no longer available. The Hiring Manager could, instead, be notified that the this candidate is no longer available.

In the representative example, the Recruiter and Hiring Manager work for the same company. Alternatively, the first client system 125 and second client system 135 may be in unrelated organizations. An example of such a relationship is where the first client system 125 is operated by a search firm attempting to place someone in an organization associated with the second client system 135. Still further, instead of the network 115 connecting the first client system 125, the second client system 135 and the resume database server 105 together, an intranet may be used and the public Internet avoided. Finally, the connection between the client system 125 and resume database server 105 could be "direct," i.e., on a corporate LAN, with communication to the second client system 135 via the network 115. This last configuration would most likely apply to a search firm where the Recruiters access the database on their intranet but send URLs to others via the Internet.

As described above, the system allows the Recruiter to track what a Hiring Manager does with resume information that has been received. The Recruiter can also control the amount of access someone without a username and password has to the resume database. By providing the Recruiter with this control, the use of the system is simplified while still providing the resume information to those who need it. The system does, however, allow an untrained user, when authorized by a trained user, to update the resume database through the use of relatively simple and easy to complete forms.

Further, the resume database system may be used to allow a candidate to verify and/or update the resume data in the database. Thus, the candidate would be sent the URL to his or her information with the capability to make any necessary changes or updates by filling out specific forms.

The example of the present system described above uses e-mail to send the URLs pointing to the resume information in the database. In yet another embodiment, instead of using e-mail, instant messaging (IM) software, one example of which is AOL Instant Messenger from America On Line, can be used to send the URL. With IM, one user has an indication of whether another user is actively on the network. If the other user is actively on the network, a message can be sent directly to the user without using an e-mail server or program. The transmission of the URL via the Instant Messaging operation can be integrated into the Automatic Agent operation as well. Further, the search could be established such that URLs are to be sent via Instant Message, if the recipient is online, otherwise the message is sent via e-mail.

As described above, one of the mechanisms for receiving the resume URL is a wireless phone with various examples of the invention based on visual review of the resume information. Alternately, the textual information in the resume database can be converted to audible voice data and conveyed in that manner to a recipient. Thus, as a choice provided to the user of the wireless phone, the resume data could be translated from the text and presented. Further, the recipient could be prompted for voice replies that could be interpreted via commercially available speech recognition software and devices. Using voice recognition can overcome limitations on data entry capabilities inherent in hand-held devices.

While a database has been shown and described for storing the resume data, one of ordinary skill in the art will understand that there are many other mechanisms, other than databases, that can be used to store resume information. These other systems are contemplated as falling within the scope of the present invention.

Having now described a few embodiments of the present invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method of providing resume information stored in a resume database to a recipient, the method comprising:
   (a) identifying, at a first client system, the resume information in the resume database;
   (b) directing, by the first client system, a system management function to send to the recipient, at a second client system, a Uniform Resource Locator, URL, pointing to the identified resume information, the step of directing includes:
      an access instruction message comprising:
      (1) an indication of a form to be completed by a user associated with a destination address;
      (2) a time duration representing a time period during which the URL is valid; and
      (3) a request for a confirmation message to be sent to the first client system when the URL is transmitted to the destination address; and
   (c) receiving by the recipient, a message comprising the URL pointing to the identified resume information.

2. The computer implemented method of claim 1, further comprising:
   storing information regarding the recipient's accessing of the identified resume information.

3. The computer-implemented method of claim 1, further comprising:
   sending a notification after the recipient has accessed the identified resume information.

4. The computer-implemented method of claim 3, wherein: the notification is sent to an entity other than the recipient.

5. A computer-implemented method of providing access to a resume database, the method comprising:
   under control of a first client system:
      sending, from the first client system, an access instruction message comprising:
      (a) an indication of a form to be completed by a user associated with a destination address:
      (b) a time duration representing a time period during which the URL is valid; and
      (c) a request for a confirmation message to be sent to the first client system when the URL is transmitted to the destination address;
   under control of a server system:
      receiving, at the server system, the access instruction message from the first client system;
      identifying, at the server system, a resume record within the access . instruction message;
      identifying, at the server system, a destination address within the access instruction message;
      creating, at the server system, a Uniform Resource Locator, URL, pointing to the resume record in the resume database;
      transmitting, from the server system, the URL to the destination address; and
   under control of a second client system:
      receiving, at the second client system, the URL at the destination address.

6. The method of claim 5, wherein the URL comprises at least one of:
   a first identifier associated with the resume record; and
   (ii) a second identifier associated with the creation of the URL.

7. A computer-implemented system for sharing resume data stored in a resume database, the system comprising:
   a database server system operative to:
      receive, at the database server system, an access instruction message from a first client system, the access instruction message comprising:
      (a) an indication of a form to be completed by a user associated with a destination address;
      (b) a time duration representing a time period during which the URL is valid; and
      (c) a request for a confirmation message to be sent to the first client system when the URL is transmitted to the destination address;
      determine, at the database server system, a resume record and destination address from the access instruction message;
      create, at the database server system, a Uniform Resource Locator, URL, pointing to the resume record in the resume database, wherein the URL is constructed to allow access to the resume record from a second client system; and send, from the database server system, the URL to the destination address.

8. The system of claim 7, wherein the database server system is further operative to:

from the access instruction message, identify, at the database server system, data to he added to the resume database, with respect to the identified resume record, by a user associated with the destination address.

9. The system of claim 8, wherein the database server system is further operative to:

prompt, at the database server system, the user associated with the destination address for the data to be added;

receive the added data: and store, at the database server system, the received data in the resume database, cross-referenced to the resume record.

* * * * *